US011187571B2

(12) United States Patent
Chao et al.

(10) Patent No.: US 11,187,571 B2
(45) Date of Patent: Nov. 30, 2021

(54) ABSOLUTE MASS BALANCE

(71) Applicant: Government of the United States of America, as represented by the Secretary of Commerce, Gaithersburg, MD (US)

(72) Inventors: Leon Shih Chao, Gaithersburg, MD (US); Jon Robert Pratt, Clarksburg, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 59 days.

(21) Appl. No.: 16/706,011

(22) Filed: Dec. 6, 2019

(65) Prior Publication Data

US 2020/0182682 A1     Jun. 11, 2020

Related U.S. Application Data

(60) Provisional application No. 62/777,274, filed on Dec. 10, 2018.

(51) Int. Cl.
    *G01G 7/02*           (2006.01)
    *G01G 1/18*           (2006.01)
    (Continued)

(52) U.S. Cl.
    CPC ................. *G01G 7/02* (2013.01); *G01G 1/18* (2013.01); *G01G 23/01* (2013.01); *G01G 23/10* (2013.01)

(58) Field of Classification Search
    CPC .......... G01G 1/18; G01G 1/185; G01G 7/00–7/045; G01G 23/01; G01G 23/10
    See application file for complete search history.

(56) References Cited

U.S. PATENT DOCUMENTS

| | | | | |
|---|---|---|---|---|
| 1,770,610 A | * | 7/1930 | Gilbert | G01G 1/18 177/195 |
| 1,880,563 A | * | 10/1932 | Weckerly | G01G 7/04 177/21 OR |

(Continued)

OTHER PUBLICATIONS

Rothleitner, C., et al., "The Planck-Balance—a Self-Calibrating Precision Balance for Industrial Applications", 59th Ilmenau Colloquium, 2017.

(Continued)

*Primary Examiner* — Randy W Gibson
(74) *Attorney, Agent, or Firm* — Office of Chief Counsel for National Institute of Standards and Technology

(57) ABSTRACT

An absolute mass balance determines an absolute mass of an object and includes: a dual diameter wheel including: a balance fulcrum; and a balance beam disposed on the balance fulcrum and including: a main mass arm and a counter mass arm; a main mass receiver that receives the object; a main magnet system including: a first main coil that produces a first magnetic field; a second main coil that produces a second magnetic field; and a permanent magnet that produces a third magnetic field that interacts with the first magnetic field and the second magnetic field; a displacement measuring system that provides a null position of the dual diameter wheel and measures a velocity of the main magnet system; and a driving motor including: an eddy current damper that provides a constant velocity of the main mass receiver; and a counter mass magnet system.

15 Claims, 31 Drawing Sheets

(51) Int. Cl.
*G01G 23/10* (2006.01)
*G01G 23/01* (2006.01)

(56) References Cited

U.S. PATENT DOCUMENTS

| | | | | | |
|---|---|---|---|---|---|
| 3,519,095 | A | * | 7/1970 | Tomes | G01G 7/04 177/21 OR |
| 3,967,691 | A | * | 7/1976 | Wirth | G01G 1/18 177/230 |
| 3,973,636 | A | * | 8/1976 | Uchida | G01G 1/18 177/132 |
| 4,153,124 | A | * | 5/1979 | Knothe | G01G 7/04 177/21 OEM |
| 4,354,563 | A | * | 10/1982 | Luchinger | G01G 7/04 177/21 OEM |
| 4,489,800 | A | * | 12/1984 | Nufer | G01G 7/04 177/21 OEM |
| 5,998,742 | A | * | 12/1999 | Liu | G01G 7/02 177/184 |
| 7,690,273 | B2 | * | 4/2010 | Reber | G01G 7/04 73/862.69 |

OTHER PUBLICATIONS

Rothleitner, C., et al., "The Planck-Balance—using a fixed value of the Planck constant to calibrate E1/E2-weights". Measurement Science and Technology, 2018, 074003, vol. 29.

Rothleitner, C., et al., "First results using the Planck-Balance", 2018 Conference on Precision Electromagnetic Measurements (CPEM 2018), 2018.

* cited by examiner (A)

(B)

Magnet shimming

Magnet shimming

ABSOLUTE MASS BALANCE

CROSS REFERENCE TO RELATED APPLICATIONS

The application claims priority to U.S. Provisional Patent Application Ser. No. 62/777,274 filed Dec. 10, 2018, the disclosure of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in the invention. Licensing inquiries may be directed to the Technology Partnerships Office, NIST, Gaithersburg, Md., 20899; voice (301) 301-975-2573; email tpo@nist.gov; reference NIST Docket Number 19-016US1.

BRIEF DESCRIPTION

Disclosed is an absolute mass balance for determining an absolute mass of an object, the absolute mass balance comprising: a dual diameter wheel comprising: a balance fulcrum on which the dual diameter wheel pivots; and a balance beam disposed on the balance fulcrum and that pivots about the balance fulcrum, the balance beam comprising: a main mass arm in mechanical communication with the balance fulcrum; and a counter mass arm laterally disposed proximate to the main mass arm and in mechanical communication with the balance fulcrum; a main mass receiver in mechanical communication with the main mass arm and that receives the object and that moves with the main mass arm; a main magnet system comprising: a first main coil in mechanical communication with the main mass receiver and the main mass arm, interposed between the main mass receiver and the dual diameter wheel, and that produces a first magnetic field and that moves with the main mass arm; a second main coil in mechanical communication with the main mass receiver and the main mass arm, interposed between the main mass receiver and the first main coil, and that produces a second magnetic field, the second main coil being in electrical communication with the first main coil and that moves with the main mass arm; and a permanent magnet disposed between the first main coil and the second main coil and that produces a third magnetic field that interacts with the first magnetic field and the second magnetic field; a displacement measuring system in mechanical communication with the permanent magnet such that displacement measuring system provides a null position of the dual diameter wheel and measures a velocity of the main magnet system; and a driving motor in mechanical communication with the counter mass arm and comprising: an eddy current damper in mechanical communication with the counter mass arm that moves with the counter mass arm, that provides a constant velocity of the main mass receiver, and that suppresses a pendulum mode of the driving motor; and a counter mass magnet system in mechanical communication with the eddy current damper, wherein the absolute mass balance determines the absolute mass of the object by comparing a weight of the object to a calibrated electromagnetic force.

Disclosed is a process for determining an absolute mass of an object with an absolute mass balance, the process comprising: disposing the object in mechanical communication with the main mass arm via the first main coil and the second main coil; operating the absolute mass balance in a velocity mode by: performing a velocity sweep by synchronously moving, at a selected velocity, the object, the main mass arm, the first main coil, and the second main coil relative to the permanent magnet in: a first direction that is along a direction perpendicular to a magnetic field of the permanent magnet; and a second direction, after moving in the first direction, wherein the second direction opposes the first direction; determining a first voltage produced from synchronously moving the first main coil, and the second main coil in the magnetic field of the permanent magnet in the first direction and the second direction; and determining a velocity mode product BL from the velocity and the first voltage reading, wherein B is a magnetic flux density and L is a length of wire of the first main coil and the second main coil; operating the absolute mass balance in a force mode by: performing an object-off measurement by: moving the first main coil and the second main coil to a weighing position; removing the object from the absolute mass balance; performing hysteresis erasing of the balance fulcrum; flowing a first force mode current through a measurement resistor in electrical communication with the first main coil and the second main coil; and determining a first force mode voltage produced from flowing the force mode current through the measurement resistor with the object removed from the absolute mass balance; performing an object-on measurement by: re-disposing the object on the absolute mass balance in mechanical communication with the main mass arm via the first main coil and the second main coil; performing hysteresis erasing of the balance fulcrum; flowing a second force mode current through the measurement resistor in electrical communication with the first main coil and the second main coil; and determining a second force mode voltage produced from flowing the force mode current through the measurement resistor with the object disposed on the absolute mass balance; converting the first force mode voltage and the second force mode voltage by weighting the first force mode voltage and the second force mode voltage with the velocity mode product BL to produce an intermediate value; and normalizing the intermediate value with respect to a resistance of the measurement resistor to determine the absolute mass of an object.

BRIEF DESCRIPTION OF THE DRAWINGS

The following description should not be considered limiting in any way. With reference to the accompanying drawings, like elements are numbered alike.

DETAILED DESCRIPTION

Figure 1:
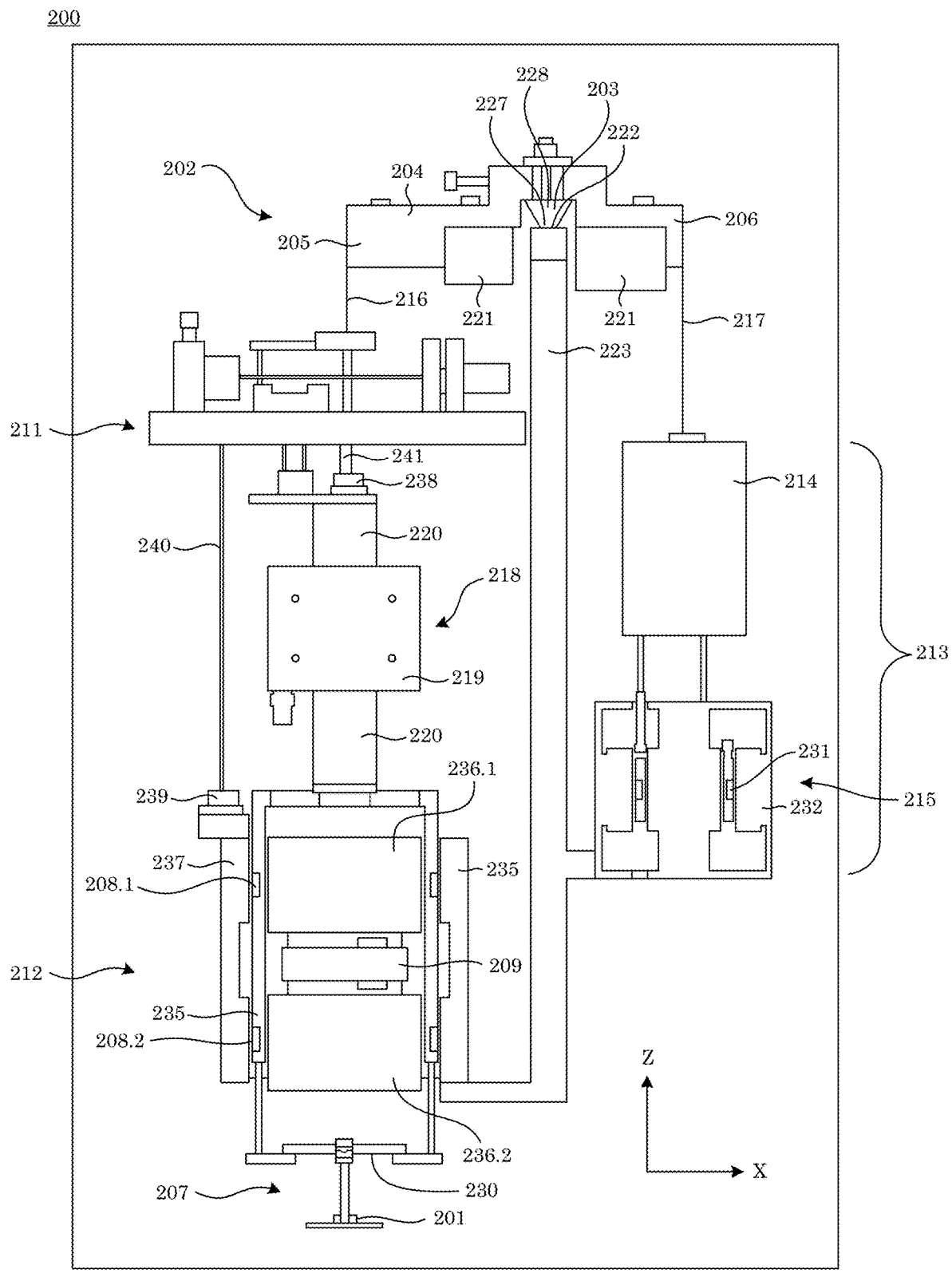
FIG. 1 shows an absolute mass balance, wherein a cross-sectional view of magnets and coils are shown.

A detailed description of one or more embodiments is presented herein by way of exemplification and not limitation.

It has been discovered that absolute mass balance 200 determines an absolute mass of object 201 by comparing a weight of object 201 to a calibrated electromagnetic force. In an embodiment with reference to FIG. 1, FIG. 2, FIG. 3, FIG. 14, FIG. 15, and FIG. 24, absolute mass balance 200 includes dual diameter wheel 202. Further with reference to FIG. 6, dual diameter wheel 202 includes balance fulcrum 203 on which dual diameter wheel 202 pivots; and balance beam 204 disposed on balance fulcrum 203 and that pivots about balance fulcrum 203. Balance beam 204 includes main mass arm 205 in mechanical communication with balance fulcrum 203; and counter mass arm 206 laterally disposed proximate to main mass arm 205 and in mechanical communication with balance fulcrum 203. Main mass receiver 207 is in mechanical communication with main mass arm 205, receives object 201, and moves with main mass arm 205. Main magnet system 212 includes first main coil 208.1 in mechanical communication with main mass receiver 207 and main mass arm 205, interposed between main mass receiver 207 and dual diameter wheel 202. Main magnet system 212 produces first magnetic field 210.1 and moves with main mass arm 205. Main magnet system 212 also includes second main coil 208.2 in mechanical communication with main mass receiver 207 and main mass arm 205, interposed between main mass receiver 207 and first main coil 208.1. Second main coil 208.2 produces second magnetic field 210.2, wherein second main coil 208.2 is in electrical communication with first main coil 208.1 and moves with main mass arm 205. Main magnet system 212 also includes permanent magnet 209 disposed between first main coil 208.1 and second main coil 208.2 and produces a third magnetic field 210.3 that interacts with first magnetic field 210.1 and second magnetic field 210.2. Absolute mass balance 200 also includes displacement measuring system 211 in mechanical communication with permanent magnet 209 such that displacement measuring system 211 provides a null position of dual diameter wheel 202 and measures a velocity of main magnet system 212; and driving motor 213 in mechanical communication with counter mass arm 206. Displacement measuring system 211 includes eddy current damper 214 in mechanical communication with counter mass arm 206 that moves with counter mass arm 206, provides a constant velocity of main mass receiver 207, and suppresses a pendulum mode of the driving motor 213; and counter mass magnet system 215 in mechanical communication with eddy current damper 214.

A material of construction of elements of absolute mass balance 200 can include a metal (e.g., aluminum, copper, stainless steel, iron, an alloy, and the like), a polymer (e.g., thermoplastic and the like), a glass, a ceramic, a combination thereof (e.g., a composite) and the like, as appropriate the function and material strength and design of the specific component.

In an embodiment, absolute mass balance 200 includes main mass tether 216 in mechanical communication with main mass arm 205 and main mass receiver 207. Counter mass tether 217 is in mechanical communication with counter mass arm 206 and eddy current damper 214. Counter mass tether 217 and main mass tether 216 independently can include a fiber or cable that includes a metal (e.g. titanium), composite (e.g. carbon fiber), and the like that has a tensile strength to withstand a maximum tensile force, e.g., 30 N, specifically 22N, and more specifically 7 N.

Figure 12:
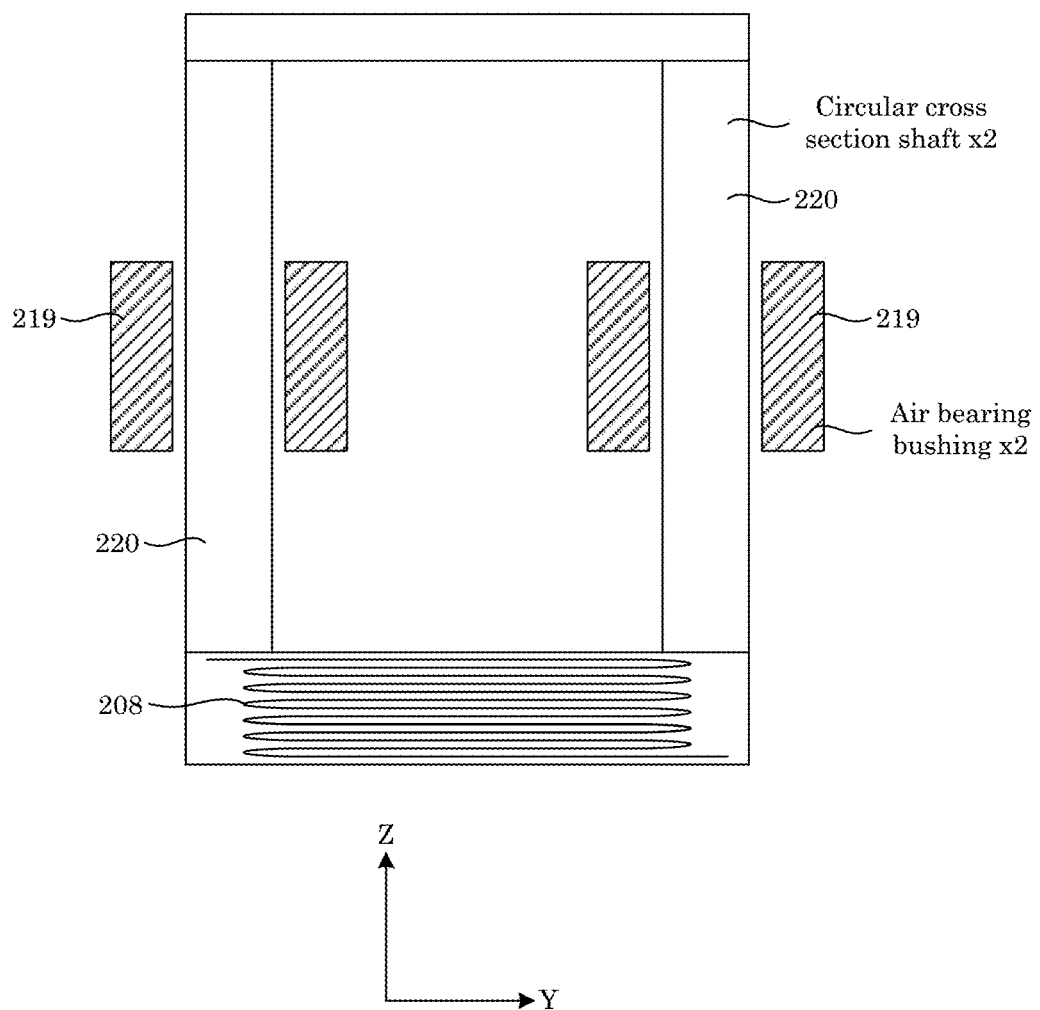
FIG. 12 shows a linear motion member.
Figure 13:
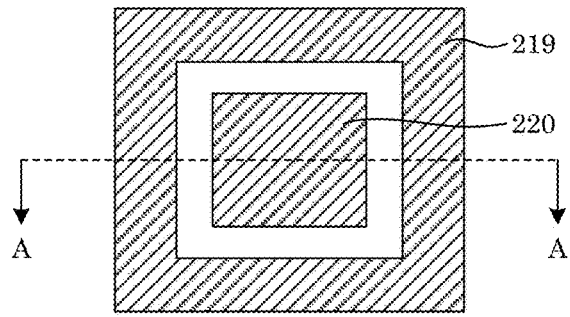
FIG. 13 shows a plan view of a linear motion member in panel A, and panel B shows a cross-section along line A-A of the linear motion member shown in panel A.
Figure 13:
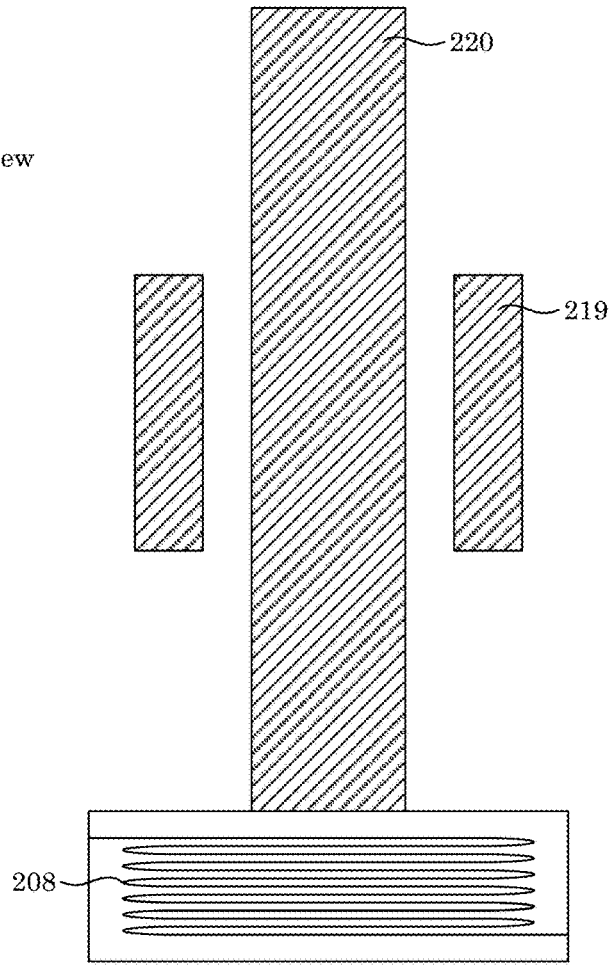

According to an embodiment, absolute mass balance 200 includes linear motion member 218 in mechanical communication with main mass arm 205 and main magnet system 212. Linear motion member 218 provides linear motion between main mass arm 205 and first main coil 208.1 and second main coil 208.2. With reference to FIG. 12 and FIG. 13, linear motion member 218 includes linear bearing 219 in mechanical communication with main mass arm 205 and main magnet system 212; and linear bearing 220 disposed around linear shaft 219. With reference to FIG. 12, two circular cross section shafts 219 with smooth surface finishes are rigidly mounted to two sides of the first coil 208.1. The two shafts reside in two circular air bearings 220. This orientation allows for vertical motion only. With reference to FIG. 13, a single square cross section shaft 219 with a smooth surface finish on all vertical faces is rigidly mounted to the top surface of the first coil 208.1 and resides in a single square cross section air bearing 220.

Figure 2:
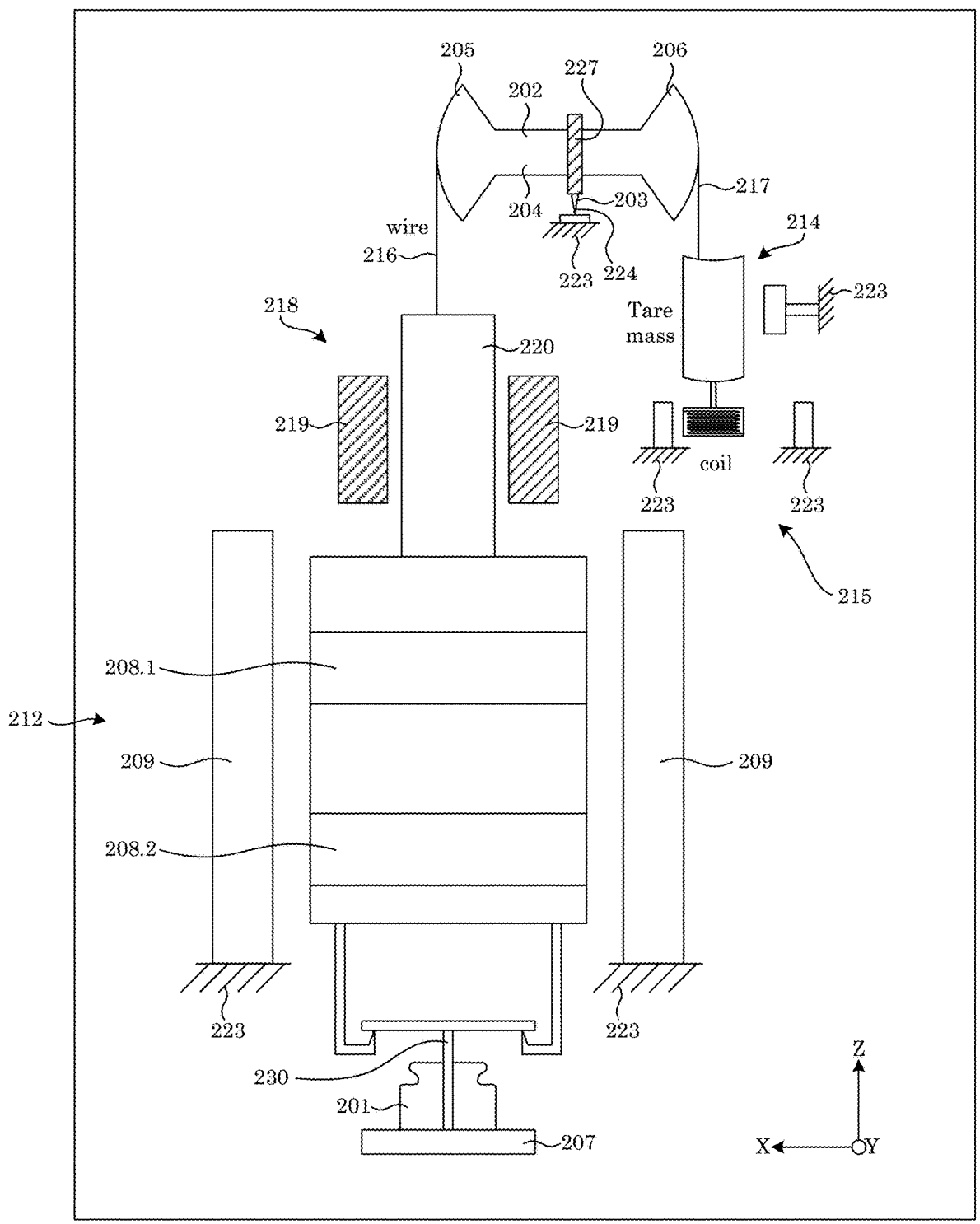
FIG. 2 shows an absolute mass balance.
Figure 7:
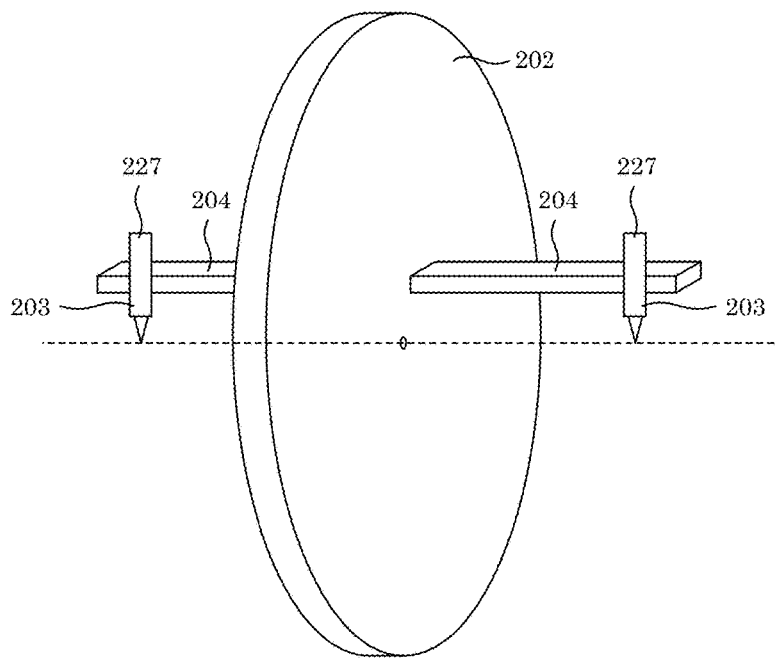
FIG. 7 shows a dual diameter wheel in panel A and pivot contactors in panels B, C, and D.
Figure 7:
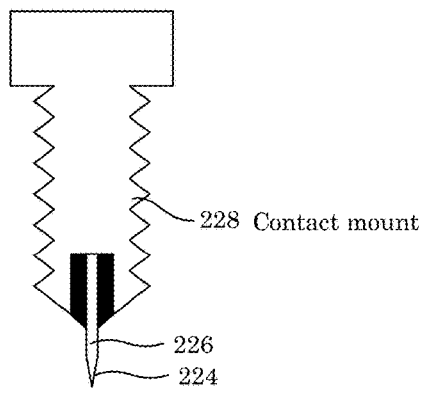
Figure 7:
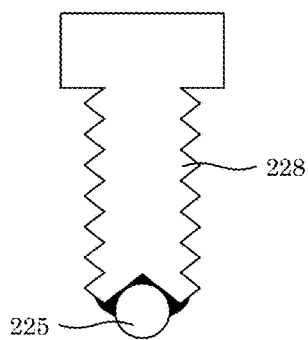
Figure 7:
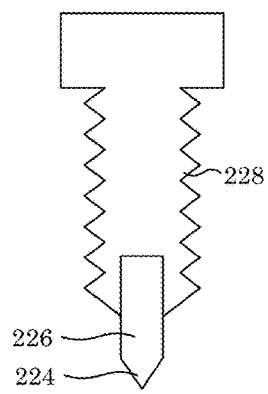
Figure 8:
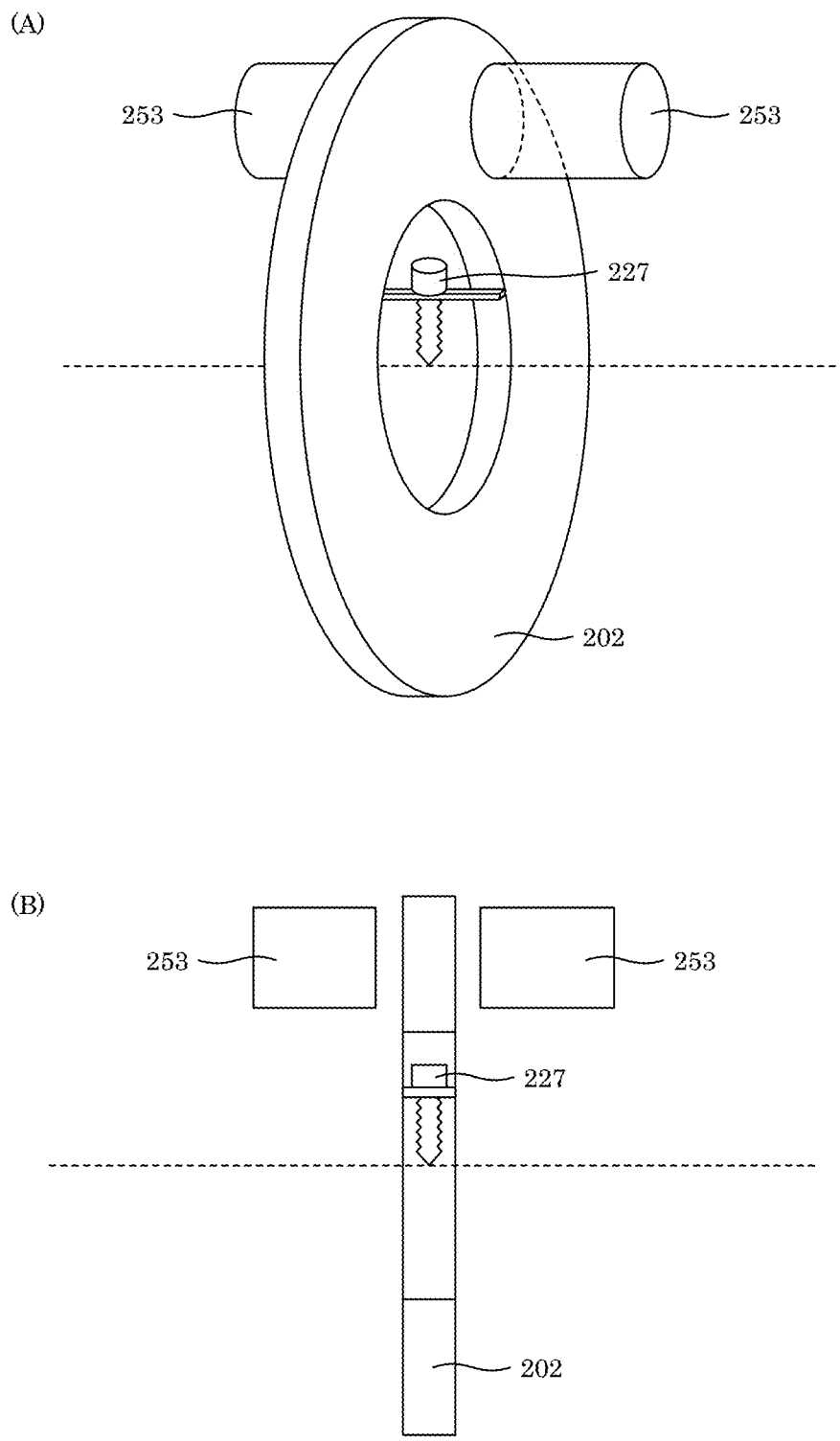
FIG. 8 shows a perspective view of a dual diameter wheel in panel A and a side view of the dual diameter wheel in panel B.

Linear motion member 218 couples and communicates motion of balance beam 204 of dual diameter wheel 202 through main mass tether 216 to main coil 208 and main mass receiver 207. With reference to FIG. 1, FIG. 2, FIG. 7, and FIG. 8, dual diameter wheel 202 can include a shape to provide such communication of motion. Exemplary shapes include a circular shape as shown in FIG. 7 and FIG. 8 that can have a selected outer radius that can be from 1 mm to 1000 mm, specifically from 10 mm to 300 mm, and more specifically from 40 mm to 90 mm; an annular shape as shown in FIG. 8 that can have a selected inner radius that can be from 0.5 mm to 900 mm, specifically from 5 mm to 200 mm, and more specifically from 20 mm to 70, wherein the inner radius and outer radius provide a radial thickness of dual diameter wheel 202; a truncated circular shape as shown in FIG. 1 and FIG. 2 that can have a radius (e.g., one radius, two radii, and the like) that independently can be from 0.5 mm to 900 mm, specifically from 5 mm to 200 mm, and more specifically from 20 mm to 70; and the like.

Figure 5:
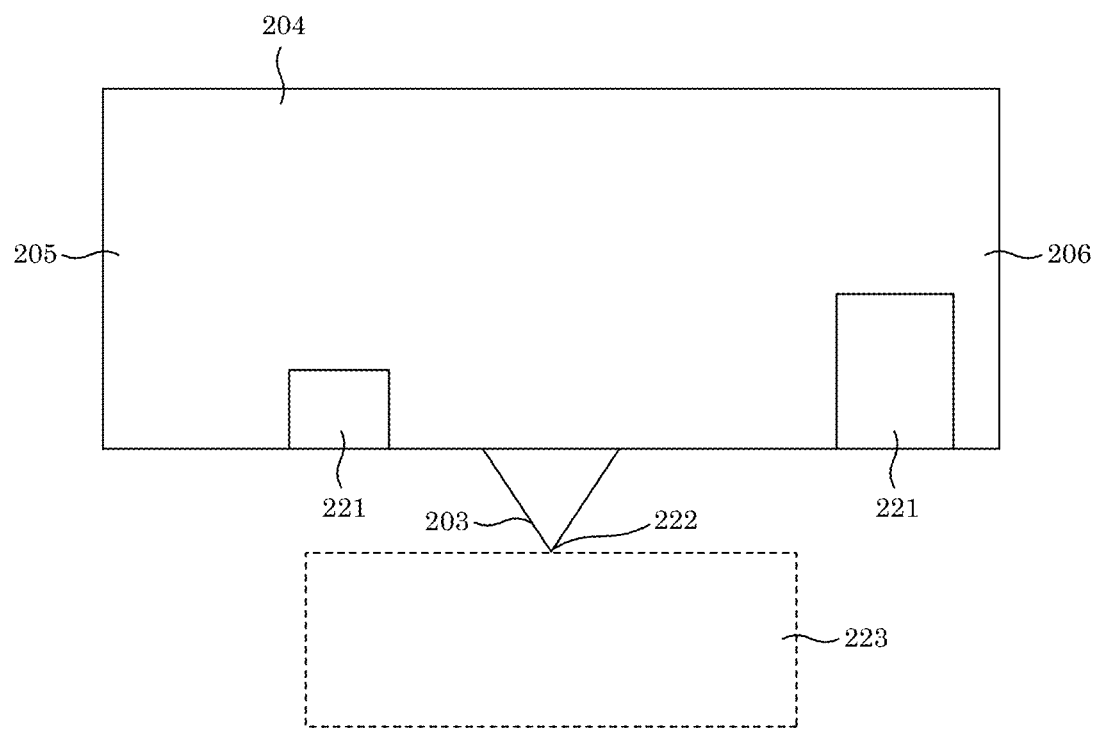
FIG. 5 shows a dual diameter wheel.
Figure 6:
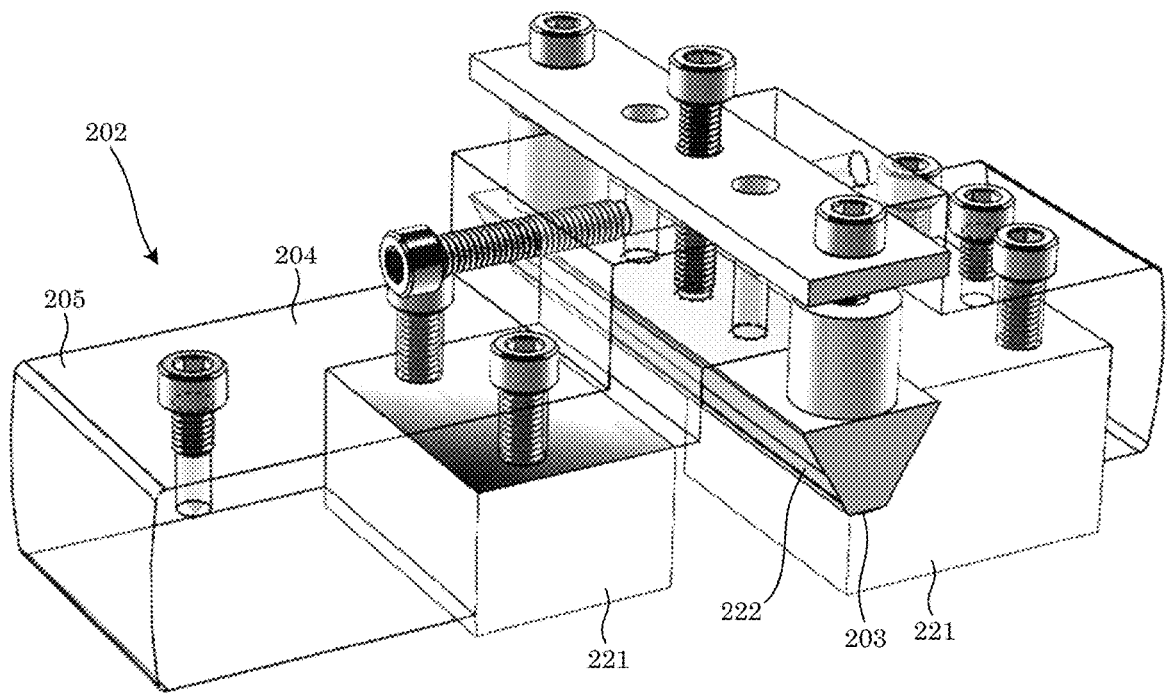
FIG. 6 shows a dual diameter wheel.
Figure 6:
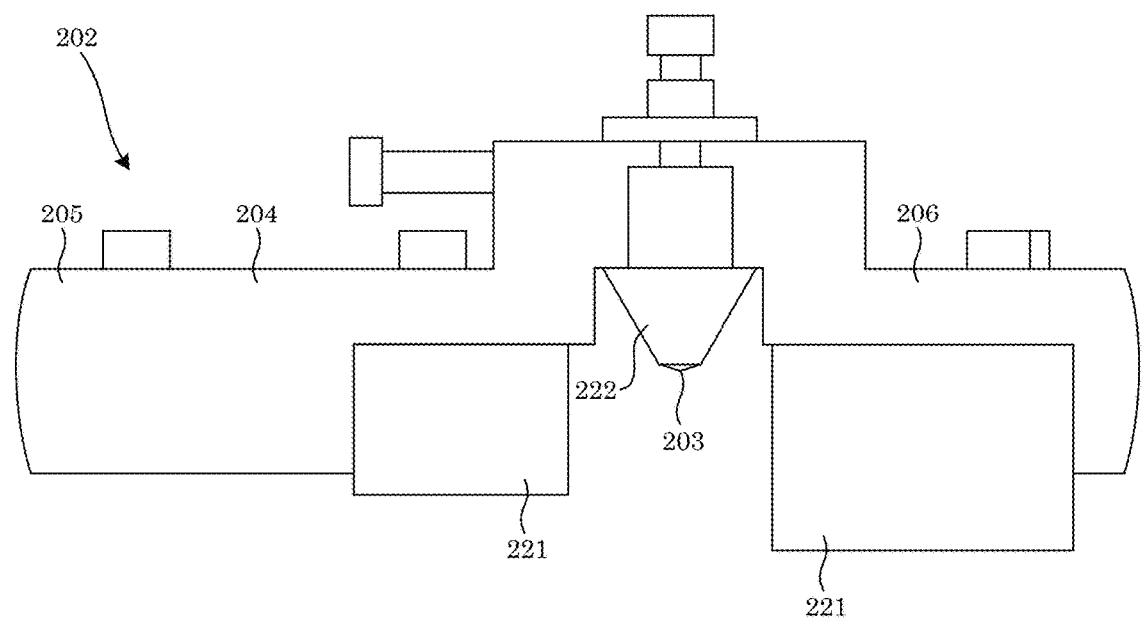

In an embodiment, with reference to FIG. 5 and FIG. 6, dual diameter wheel 202 can include balance beam 204 that include center-of-mass adjuster 221 can include objects of arbitrary geometries made from dense materials such as copper or tungsten capable of rigid mechanical communication with the balance beam 204. Balance fulcrum 203 is disposed on balance beam 204 and can include a physical line contact provided by a knife edge 222 or a virtual line contact provided by two point contacts 227. Exemplary balance fulcrums 203 include a prism-shaped member, wherein flat portion 256 of balance fulcrum 203 opposes knife edge 222 such that knife edge 222 contacts bulkhead 223 that supports dual diameter wheel 202 and on which knife edge 222 pivots to produce motion of dual diameter wheel 202. With regard to bulkhead 223, bulkhead 223 can include a rigid mounting plate made of aluminum or the like that provides a horizontal surface for interfacing with the knife edge 222 and a vertical surface for mounting the linear bearing 220. Exemplary bulkheads 223 includes a structural support, e.g., an aluminum plate, bracket, or optical breadboard, and the like that can include mounting provisions (e.g., threaded holes to receive a threaded fastener such as a screw or bolt) for mounting various components of absolute mass balance 200 thereto. In this manner, bulkhead 223 provides structural support and a reference position of components that are statically mounted to bulkhead 223 (e.g., displacement measuring system 211, linear bearing 220, housing 237, permanent magnet 209, and the like) relative to free-moving components of absolute mass balance 200 such as dual diameter wheel 202, main mass receiver 207 (when not immobilized for force mode operation of absolute mass balance 200), main coil 208, eddy current damper 214, yoke 236, and the like.

In some embodiments, with reference to FIG. 7 and FIG. 8, dual diameter wheel 202 can include pivot contactor 227 that can be disposed on bulkhead 223, wherein dual diameter wheel 202 pivots about pivot contactor 227 relative to bulkhead 223. It is contemplated that balance beam 204 can be interposed between pivot contactor 227 and dual diameter wheel 202 to provide mechanical communication therebetween. Pivot contactor 227 can include contact mount 228 in which is disposed pin 226 having pin point 224, ball 225, and the like, wherein pivot contactor 227 pivots dual diameter wheel 202 about pin point 224 or ball 225. In certain embodiment, air bearing disk 253 can be disposed proximate to and spaced apart from dual diameter wheel 202 to provide an additional physical constraint for a single point contact knife edge 222.

Figure 9:
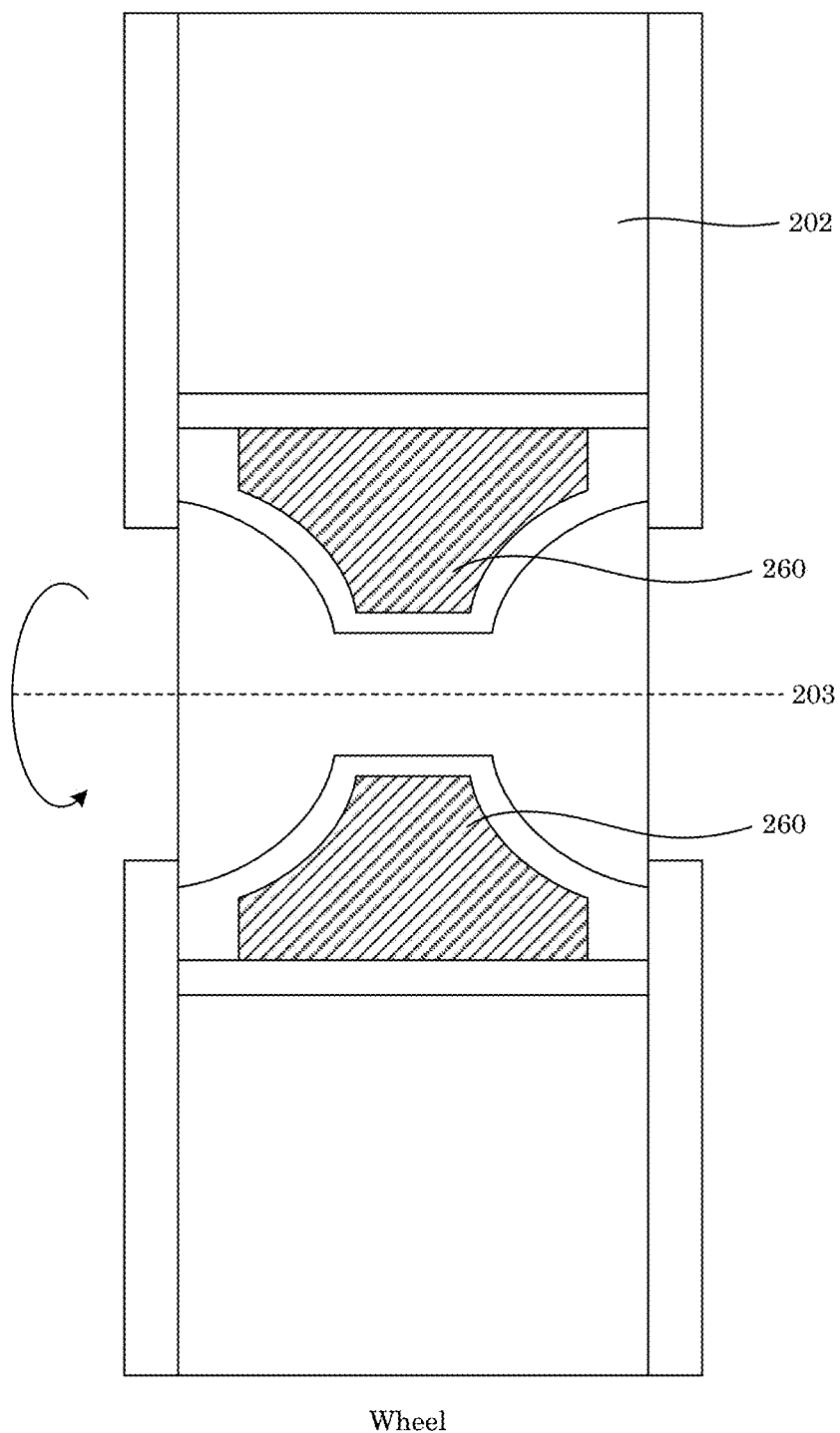
FIG. 9 shows a side view of a dual diameter wheel with a bi-spherical air bearing spindle.

According to an embodiment, with reference to FIG. 9, dual diameter wheel 202 includes bi-spherical air bearing spindle 254 and bi-spherical air bearing 260. Bi-spherical air bearing spindle 254 provides an alternative balance fulcrum 203 and is comprised of two hemispherical pieces with smooth surface finishes which are rigidly mounted against one another residing inside a matching shaped bi-spherical air bearing 260.

In an embodiment, pivot contactor 227 includes knife edge 222, pin point 224, or ball 225 in contact with bulkhead 223. In an embodiment, pivot contactor 227 further includes contact mount 228 and pin 226 disposed on contact mount 228, wherein pin 226 includes pin point 224. In an embodiment, pivot contactor 227 includes contact mount 228, wherein ball 225 disposed on contact mount 228.

Dual diameter wheel 202 is in mechanical communication with main mass receiver 207. In an embodiment, with reference to FIG. 1 and FIG. 2, main mass receiver 207 includes mass pan 229 that receives object 201; and mass pan gimbal 230 interposed between mass pan 229 and main magnet system 212. Mass pan 229 can include a plate that supports a weight of object 201 and can be aluminum, copper, and the like. Exemplary mass pan 229 includes a structural support platform for object 201 and the like. Moreover, mass pan 229 includes a three-winged star cutout for allowing passage of a similar shaped column for separating object 201 from mass pan 229. It is contemplated that absolute mass balance 200 can include an element that receives a hanging format of object 201 so that instead of disposed object 201 on mass pan 229, object 201 can be hung from absolute mass balance 200 to be in mechanical communication with main coil 208. Further, mass pan gimbal 230 can include a free-hanging pendulum with no restoring force. Exemplary mass pan gimbal 230 includes two cross bars oriented orthogonal relative to each other where each bar pivots independently about an axis provided by two pins disposed in corresponding grooves and the like. Moreover, mass pan gimbal 230 behaves like a free-hanging pendulum and allows for self-centering of object 201 with respect to the mass pan 229. In an embodiment, mass pan gimbal 230 provides mechanical communication between the coil 208 and the mass pan 229.

Figure 10:
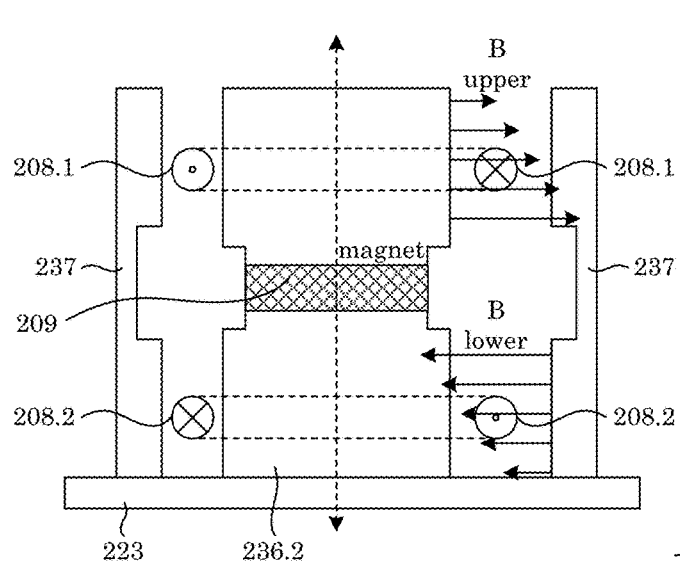
FIG. 10 shows an original state of the magnet assembly and the magnetic flux density profile with no shimming.
Figure 10:
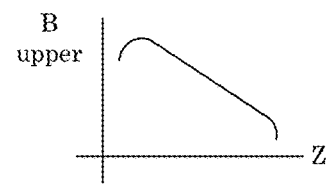
Figure 10:
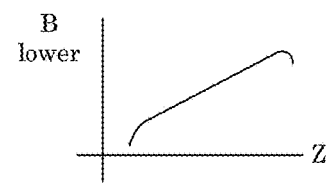
Figure 10:
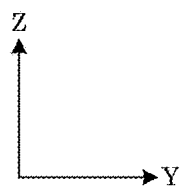
Figure 10:
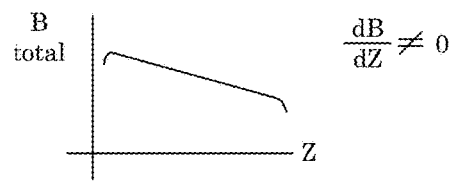
Figure 11:
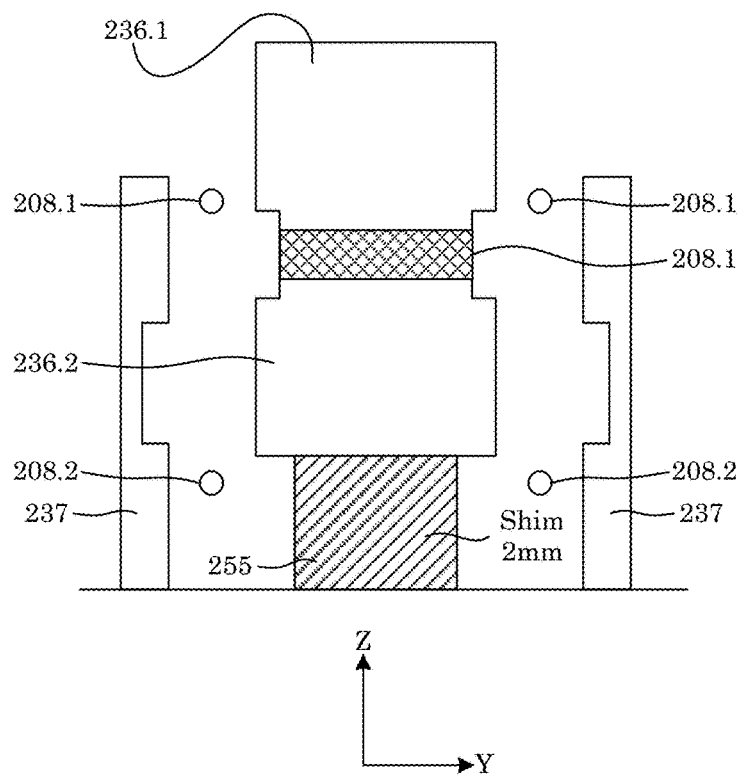
FIG. 11 shows a shimmed state of the magnet assembly and the magnetic flux density profile with shimming.
Figure 11:
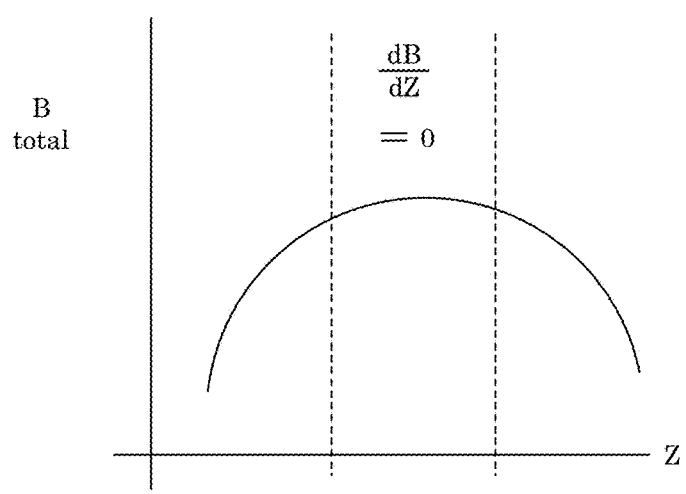

Main mass receiver 207 is in mechanical communication with dual diameter wheel 202 via main coil 208 of main magnet system 212. In an embodiment, with reference to FIG. 3, FIG. 10, and FIG. 11, main magnet system 212 includes: housing 237 in mechanical communication with bulkhead 223. Housing 237 can include a circular sleeve enclosing main coil 208 while providing the return path of the magnetic circuit and can be made from ferromagnetic materials such as steel. Exemplary housings 237 two identical mild steel sleeves stacked on top of one another, and the like. A height and diameter of housing 237 independently can be from 2 mm to 500 mm, specifically from 10 mm to 250 mm, and more specifically from 80 mm to 120 mm. Moreover, housing 237 has a nonuniform wall thickness to aid in steering the magnetic circuit toward the main coil 208. In an embodiment, housing 237 is in mechanical communication with bulkhead 223. Main magnet system 212 includes coil former 235 on which first main coil 208.1 and second main coil 208.2 are disposed and that is disposed in housing 237 and that moves with main mass arm 205 and main mass receiver 207. Coil former 235 can include a rigid ring for which the main coil 208 can be wound on and can be fabricated from nonmagnetic materials such as plastic or ceramic. Exemplary coil formers 235 include an inverted cup shaped mechanism with two rectangular cross section grooves cut along the circumference for the main coil 208 made from plastic, and the like. A height and diameter of coil former 235 can be from 2 mm to 500 mm, specifically from 10 mm to 250 mm, and more specifically from 50 mm to 90 mm. Moreover, coil former 235 contains vent holes on the top surface for trapped air to escape during velocity mode and threaded holes for mounting. In an embodiment, coil former 235 includes a direct surface for holding main coil 208 and is in mechanical communication with mass pan receiver 207 and linear shaft 219.

Main coil 208 (e.g., 208.1, 208.2) can include conductive wire forming one or more loops. Exemplary coils 208 include insulated circular cross section copper wire forming over 3000 turns for both 208.1 and 208.2, and the like. A height of main coil 208 can be from 1 mm to 50 mm, specifically from 3 mm to 30 mm, and more specifically from 5 mm to 15 mm. A diameter of main coil 208 can be from 10 mm to 500 mm, specifically from 30 mm to 300 mm, and more specifically from 50 mm to 100 mm. Moreover, main coil 208 is wound from fine gauge wire to maximize a number of turns and packing density in the grooves provided on coil former 235. In an embodiment, main coil 208 is in mechanical communication with coil former 235 and electrical communication with the electrical system 250 and electronics system 251.

First yoke 236.1 is disposed in housing 237 and in mechanical communication with housing 237, and second yoke 236.2 is disposed in housing 237 opposing first yoke 236.1 and in mechanical communication with housing 237 and first yoke 236.1, wherein permanent magnet 209 is disposed on and interposed between first yoke 236.1 and second yoke 236.2. Yoke 236 (e.g., 236.1, 236.2) can include cylinders composed of ferromagnetic material for guiding magnetic flux. Exemplary yokes 236 include mild steel cylinders with and extrusion to match the diameter of the permanent magnet 209, and the like. A height of yoke 236 can be from 5 mm to 200 mm, specifically from 10 mm to 100 mm, and more specifically from 30 mm to 60 mm. A diameter of yoke 236 can be from 5 mm to 200 mm, specifically from 10 mm to 100 mm, and more specifically from 40 mm to 80 mm. Moreover, yoke 236 incorporates circular extrusion to match the diameter of permanent magnet 209 and three shallow ledges cut into the extrusion for interfacing with an external device necessary for separating the permanent magnet 209 from yokes 236. A central tapped hole on the opposite surface allows for mounting to a baseplate, such as a bulkhead. In an embodiment, yoke 236 is in mechanical communication with permanent magnet 209 and housing 237 while in electromagnetic communication with main coil 208. Permanent magnet 209 can include a solid disk generating a permanent magnetic field along its axial direction and can be rare earth materials such as samarium cobalt or neodymium. Exemplary permanent magnets 209 include a samarium cobalt disk with an axial magnetization, and the like. A magnetic flux density of permanent magnet 209 can be from 0.01 T to 3 T, specifically from 0.05 T to 2 T, and more specifically from 0.1 T to 1 T. Moreover, permanent magnet 209 generates a magnetic field that is more temperature stable than other rare earth permanent magnetics of similar size. In an embodiment, permanent magnet 209 is in mechanical communication with yokes 236, magnetic communication with yokes 236 and housing 237, and electromagnetic communication with main coil 208. Permanent magnet can be shimmed to produce a selected spatial profile of magnetic flux density. Shimming can be performed by raising yokes 236 and permanent magnet 209 with respect to housing 237 or vice versa. In an embodiment, shim 255 includes a thin, rigid disk of a nonmagnetic material able to withstand compressive forces. Exemplary shims 255 include aluminum washers, hard plastic rings, and the like. In an embodiment, shim 255 is in mechanical communication with yokes 236 and housing 237.

To counter-act pendular modes of various components of absolute mass balance 200 and to provide force mode operation of absolute mass balance 200, absolute mass balance 200 includes counter mass magnet system 215. Counter mass magnet system 215 includes counter mass coil 231 in mechanical communication with eddy current damper 214; and counter mass magnet 232 in which counter mass coil 231 is disposed. Here, counter mass coil 231 can include conductive wire forming one or more loops. Exemplary counter mass coils 231 include insulated circular cross-section copper wire forming over 500 turns, and the like. A height of counter mass coil 231 can be from 1 mm to 30 mm, specifically from 3 mm to 20 mm, and more specifically from 5 mm to 10 mm. A diameter of counter mass coil 231 can be from 1 mm to 150 mm, specifically from 10 mm to 100 mm, and more specifically from 20 mm to 50 mm. In an embodiment, counter mass coil 231 is in mechanical communication with eddy current damper 214 and electrical communication with the electrical system 250 and electronics system 251.

Further, eddy current damper 214 can include a metallic, nonmagnetic, smooth surface for which permanent magnets can interface without mechanical contact. Exemplary eddy current dampers 214 include a copper hollow cylinder surrounded by permanent magnets, and the like. Moreover, eddy current damper 214 is suspended from counter mass tether 216 and is surrounded by neodymium magnets to reduce the pendular motions of eddy current damper 214. In an embodiment, eddy current damper 214 is in mechanical communication with counter mass tether 216 and counter mass coil 231 and in magnetic communication with external neodymium magnets in mechanical communication with bulkhead 223.

Absolute mass balance 200 includes displacement measuring system 211 for tracking the displacements of main coil 208 with respect to main magnet system 212. In an embodiment, with reference to FIG. 1, displacement measuring system 211 includes a Michelson heterodyne interferometer that includes laser 233 that produces source light 234. Here, reference mirror 239 is disposed on housing 237 in optical communication with laser 233. Reference mirror 239 receives source light 234 from laser 233 and produces reference light 240 from source light 234. Displacement mirror 238 is disposed on linear bearing 219 in optical communication with laser 233, receives source light 234 from laser 233, and produces displacement light 241 from source light 234. Reference photodetector 242 is in optical communication with laser 233, receives source light 234 from laser 233, and produces reference signal 244 from source light 234. Displacement measuring system 211 also includes measurement photodetector 243 that is in optical communication with reference mirror 239 and displacement mirror 238. Source light 234 receives reference light 240 from reference mirror 239, receives displacement light 241 from displacement mirror 238, and produces interference signal 245 from reference light 240 and displacement light 241.

Absolute mass balance 200 has numerous advantageous and unexpected benefits and uses. In an embodiment, with reference to FIG. 25, FIG. 26, Example 1, and Example 2, a process for determining an absolute mass of object 201 with absolute mass balance 200 includes: disposing object 201 in mechanical communication with main mass arm 205 via first main coil 208.1 and second main coil 208.2 by disposing object 201 on main mass receiver 207; operating absolute mass balance 200 in velocity mode. Velocity mode includes performing a velocity sweep by synchronously moving, at a selected velocity, object 201, main mass arm 205, first main coil 208.1, and second main coil 208.2 relative to permanent magnet 209 in a first direction that is along a direction perpendicular to a magnetic field of permanent magnet 209 and in a second direction, after moving in the first direction, wherein the second direction opposes the first direction; determining a first voltage produced from synchronously moving first main coil 208.1, and second main coil 208.2 in the magnetic field of permanent magnet 209 in the first direction and the second direction; and determining a velocity mode product BL from the velocity and the first voltage reading, wherein B is a magnetic field strength and L is a length of wire of first main coil 208.1 and second first main coil 208.2. The process for determining the absolute mass of object 201 with absolute mass balance 200 also includes operating absolute mass balance 200 in a force mode. Force mode includes performing an object-on measurement by: moving first main coil 208.1 and second main coil 208.2 to a weighing position; removing object 201 from absolute mass balance 200; performing hysteresis erasing of balance fulcrum 203; flowing a first force mode current through measurement resistor 248 in electrical communication with first main coil 208.1 and second main coil 208.2; and determining a first force mode voltage produced from flowing the force mode current through measurement resistor 248 with object 201 removed from absolute mass balance 200. Force mode further includes performing an object-off measurement by: re-disposing object 201 on absolute mass balance 200 in mechanical communication with main mass arm 205 via first main coil 208.1 and second main coil 208.2; performing hysteresis erasing of balance fulcrum 203; flowing a second force mode current through measurement resistor 248 in electrical communication with first main coil 208.1 and second main coil 208.2; and determining a second force mode voltage produced from flowing the force mode current through measurement resistor 248 with object 201 disposed on absolute mass balance 200. The process for determining the absolute mass of object 201 with absolute mass balance 200 also includes converting the first force mode voltage and the second force mode voltage by weighting the first force mode voltage and the second force mode voltage with the velocity mode product BL to produce an intermediate value; and normalizing the intermediate value with respect to a resistance of measurement resistor 248 to determine absolute mass of an object 201.

Figure 4:
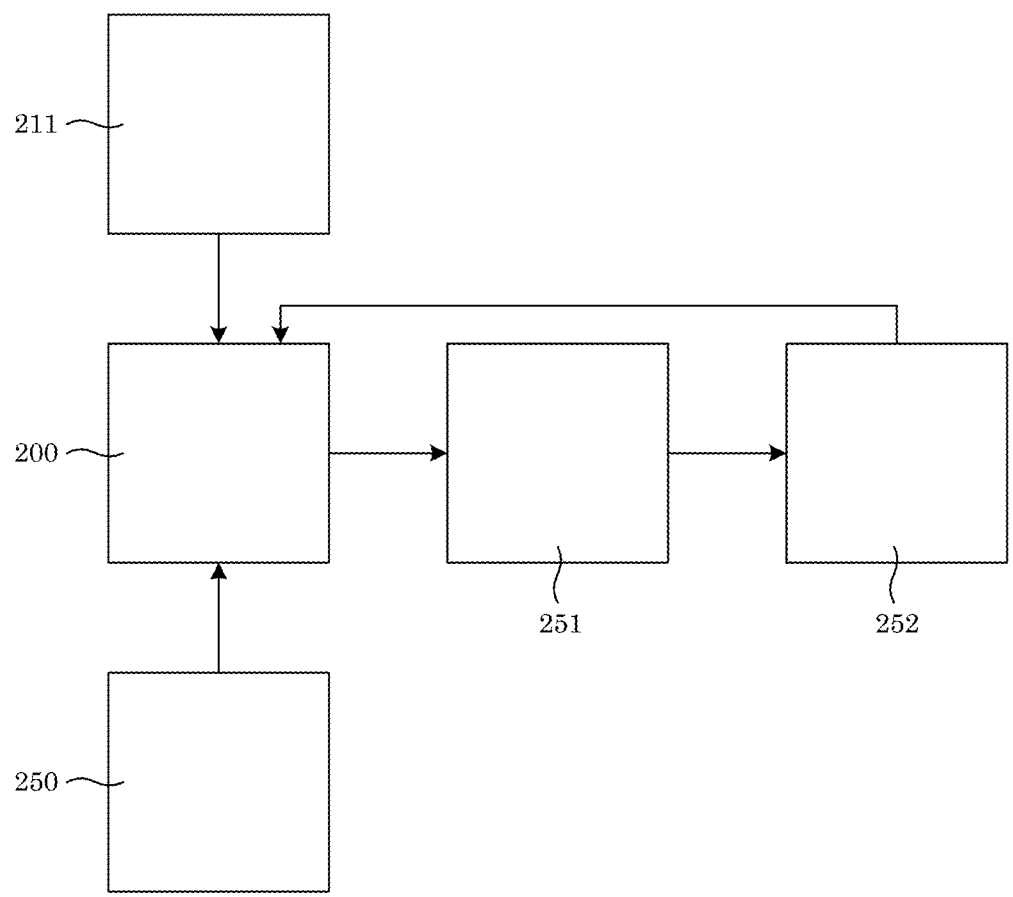
FIG. 4 shows an absolute mass balance system.
Figure 26:
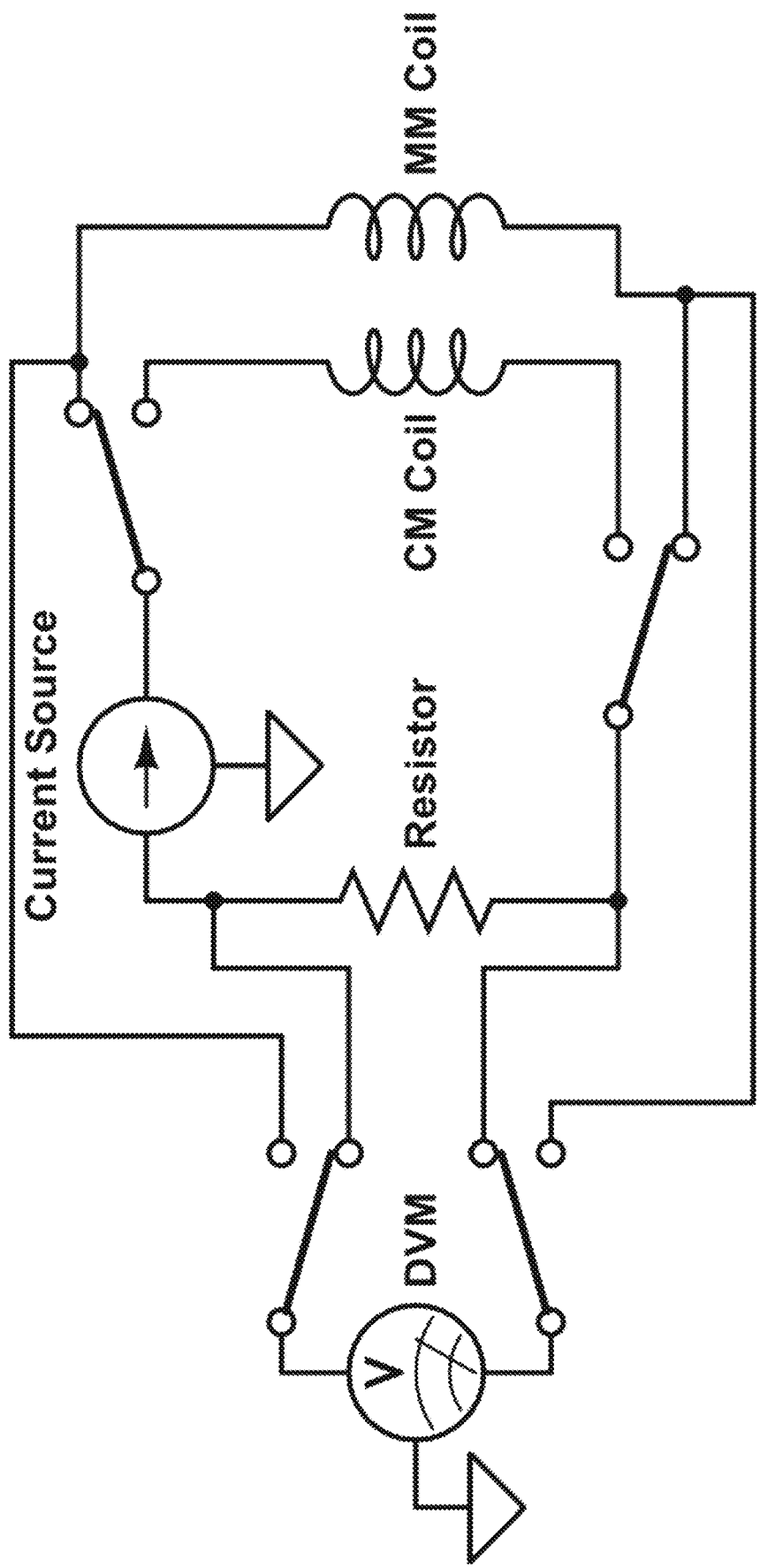
FIG. 26 shows a circuit for use in force mode operation of an absolute mass balance; DVM measures a voltage drop across the resistor, and a current source supplies the main mass coil; velocity mode occurred when all four relays were toggled, wherein DVM measures the induced voltage from the main coil while the current source drives the counter mass coil.
Figure 27:
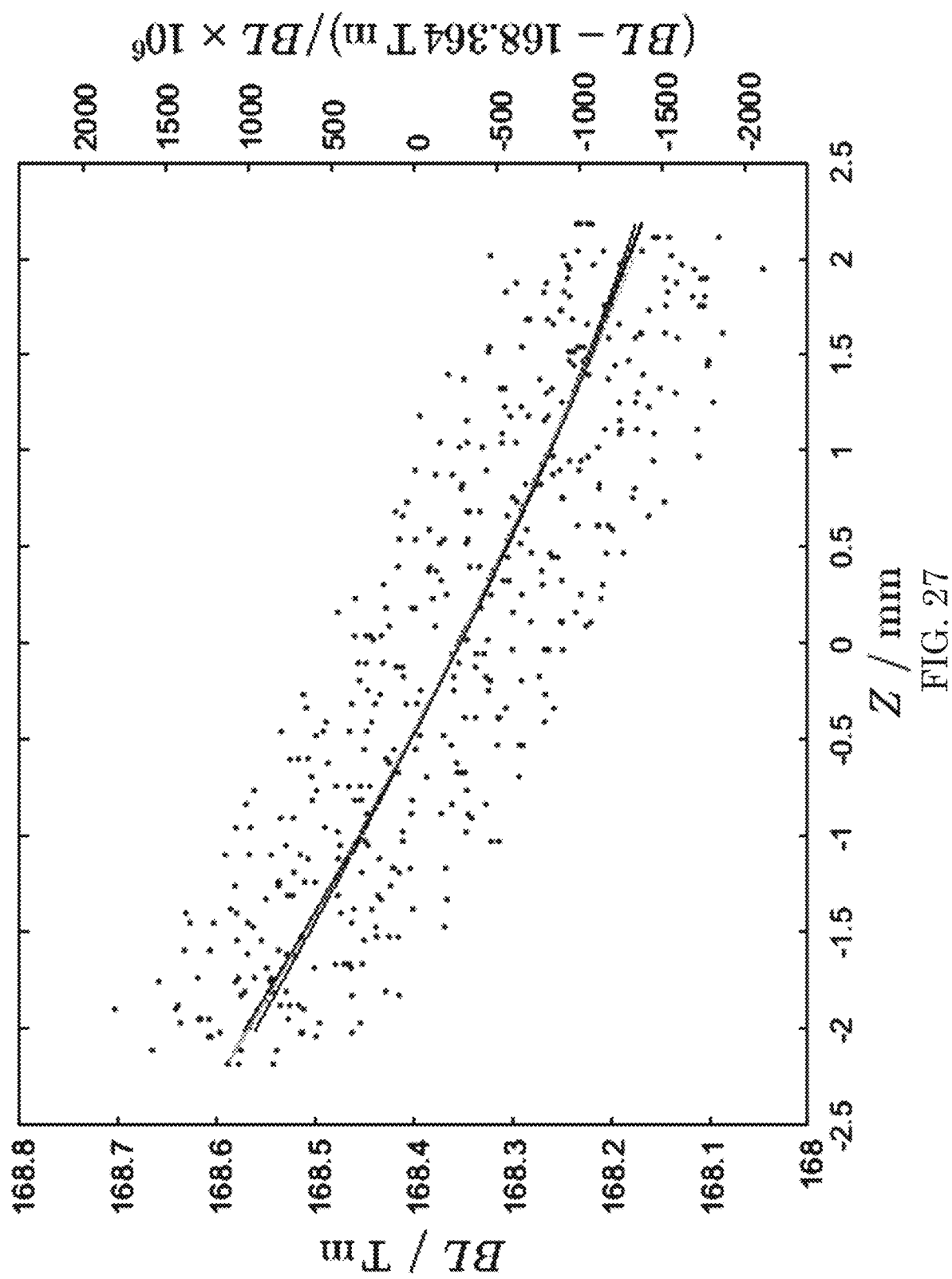
FIG. 27 shows a single set of velocity mode BL measurements; each solid line is a second order fit of a 60-point sweep ranging between Z=±2.2 mm at 1 mm/s. In total, 6 sweeps are conducted per velocity mode measurement, wherein each data point is an average value of one set of fits taken at Z=0. The slope around Z=0 is 0.118 T m/mm.
Figure 28:
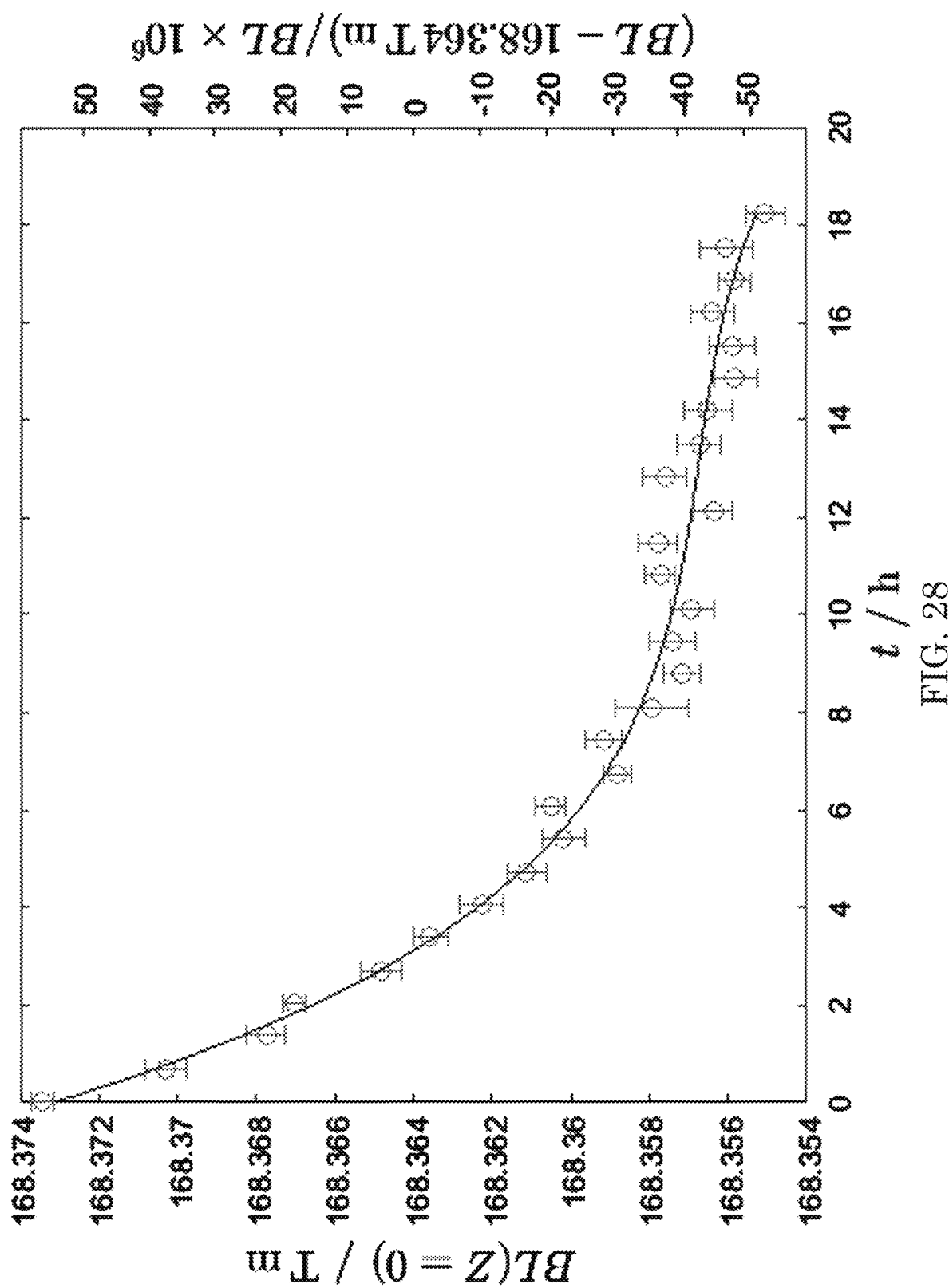
FIG. 28 shows BL determinations of a full measurement for a 5-g mass determination. The relative statistical uncertainty of each determination was on average $2 \times 10^{\wedge}(-6)$ (k=1), wherein drift was caused by change of magnetization due to temperature changes.

In an embodiment, with reference to FIG. 4, absolute mass balance system 249 that includes absolute mass balance 200, electrical system 250 in electrical communication with absolute mass balance 200, electronics system 251 in electrical communication with absolute mass balance 200, and controller system 252 in electrical communication with electronics system 251. In an embodiment, electronics system 251 includes a digital voltmeter, time interval analyzers, field programmable gate array, GPS receiver, and clock used for the precision measurement of voltage and time where the triggering of the measurements is provided by the field programmable gate array. Moreover, electronics system 251 is in electrical communication with electrical system 250, absolute mass balance 200, optical system 211, and controller system 252, e.g., a computer. In an embodiment, electrical system 250 includes main coil 208, resistor, and current source in electrical communication, e.g., through a communication bus, as seen in FIG. 26. Exemplary electrical system 250 includes main coil 208, a commercial precision resistor, a Vernier current source, and the like. Moreover, electrical system 250 provides the electrical current for velocity mode and force mode operation. In an embodiment, electrical system 250 includes a high stability 1000 Ohm resistor, Vernier current source with 26 bits of resolution and a range of ±1 mA. In an embodiment, controller system 252 includes a digital proportional-integral-derivative (PID) closed loop controller. Exemplary controller system 252 includes custom programmed software for implementation of the PID controller, and the like. In an embodiment, controller system 252 includes a closed loop controller using a fast sampling data acquisition (DAQ) system embedded inside of the computer in electrical communication with electrical system 250 and electronics system 251.

Absolute mass balance 200 and processes disclosed herein have numerous beneficial uses, including a fully tabletop instrument capable of operation without a vacuum environment and absolute determination of mass in an absence of comparison to reference mass standards. Advantageously, absolute mass balance 200 overcomes limitations of technical deficiencies of conventional processes such as conventional mass dissemination, wherein determination of small masses relies on the careful traceability scaled from the 1 kg artifact standard, represented by a series of tedious inter-comparisons ultimately tracing back to primary mass laboratories.

Absolute mass balance 200 and processes herein streamline the dissemination chain by removing mass inter-comparisons upstream of the gram-level. Moreover, absolute mass balance 200 provides an alternate traceability chain to electrical standards rather than the traditional mass standards and provides industrial laboratories with direct realization of small masses.

The articles and processes herein are illustrated further by the following Examples, which are non-limiting.

EXAMPLES

Example 1. Design and Development of an Absolute Mass Balance

The unit of mass, the kilogram, is a fixed value of the Planck constant h, and an absolute mass balance, also referred to herein as a Kibble balance (KB), tabletop Kibble balance, or tabletop-sized Kibble balance (KIBB-g1), provides determination of a mass of an object. Upon fixing the Planck constant, mass is directly realized, relinquishing a physical kilogram standard as a historically artifact. At the National Institute of Standards and Technology (NIST), the absolute mass balance was operated at a gram-level range with uncertainties on the order of a few parts in $10^6$.

A maximum permitted uncertainty for International Organization of Legal Metrology (OIML) class $E_1$ calibration weights ranging from 1 g to 10 g is on the order of a few g, limited by accrued uncertainties associated with repeatability of balances used within the traceability chain to the IPK and the stability of the artifacts. With the revised SI, mass can be directly realized at any scale point (i.e. milligram, gram, kilogram, etc.). Instrument manufacturers and pharmaceutical companies have interest in directly measuring small masses. The absolute mass balance realizes mass with the same level of uncertainties associated with a set of calibration weights that replace such a set. Operating at this level of relative uncertainty removes demand for quantum electrical standards, gravimeters, and high vacuum environments. Here, the absolute mass balance—KIBB-g1, or (KIB)ble (B)alance at the (g)ram level—achieved uncertainties on the order of a few g.

The absolute mass balance is different than a conventional equal-arm beam balance. A conventional beam balance makes relative measurements, comparing a weight of an object to that of a calibrated mass. The absolute mass balance makes absolute measurements, comparing the weight of an object to a frequently calibrated electromagnetic force determined by electrical quantities. The absolute mass balance includes two modes of operation, velocity mode and force mode. Velocity mode is based on the principle of Faraday's law of induction. A coil (wire length L) is moved at a velocity v through a magnetic field (flux density B) so that a voltage V is induced. The induced voltage is related to the velocity through the flux integral BL:

$$V = BLv. \quad (1)$$

Force mode is based on Lorentz forces. The gravitational force on a mass m is counteracted by an upward electromagnetic force F generated by the now current-carrying coil in a magnetic field:

$$F = BLI = mg \quad (2)$$

where g is the local gravitational acceleration and I is the current in the coil.

By combining Eqs. (1) and (2), canceling out the BL factor common to both equations, and rearranging the variables, expressions for electrical and mechanical power are equated and a solution for mass is obtained:

$$VI = mgv \Rightarrow m = \frac{VI}{gv} \quad (3)$$

The equation above relates mechanical power to electrical power and provides a means to relate mass to electrical quantities. The relationship equates "virtual" power, in the sense that the factors of each product, V and I or mg and v, are not measured simultaneously, but separately in the two modes. The "power" only exists virtually, i.e., as a mathematical product.

Since absolute mass balance provides relative uncertainties on the order of a few parts in $10^6$, the Planck constant makes a subtle appearance for absolutely calibrating hardware for electrical quantities.

The absolute mass balance provides industrial laboratories to directly realize mass units at the gram level on-site. The absolute mass balance can include a form factor that is a tabletop-sized instrument; have low-cost that can be less than 50,000 USD; can determine a mass absolutely, e.g., from 1 g to 10 g, can obtain a relative uncertainty that is $\approx 10^{-6}$; can be operated in conveniently in air in an absence of vacuum around the absolute mass balance.

Figure 14:
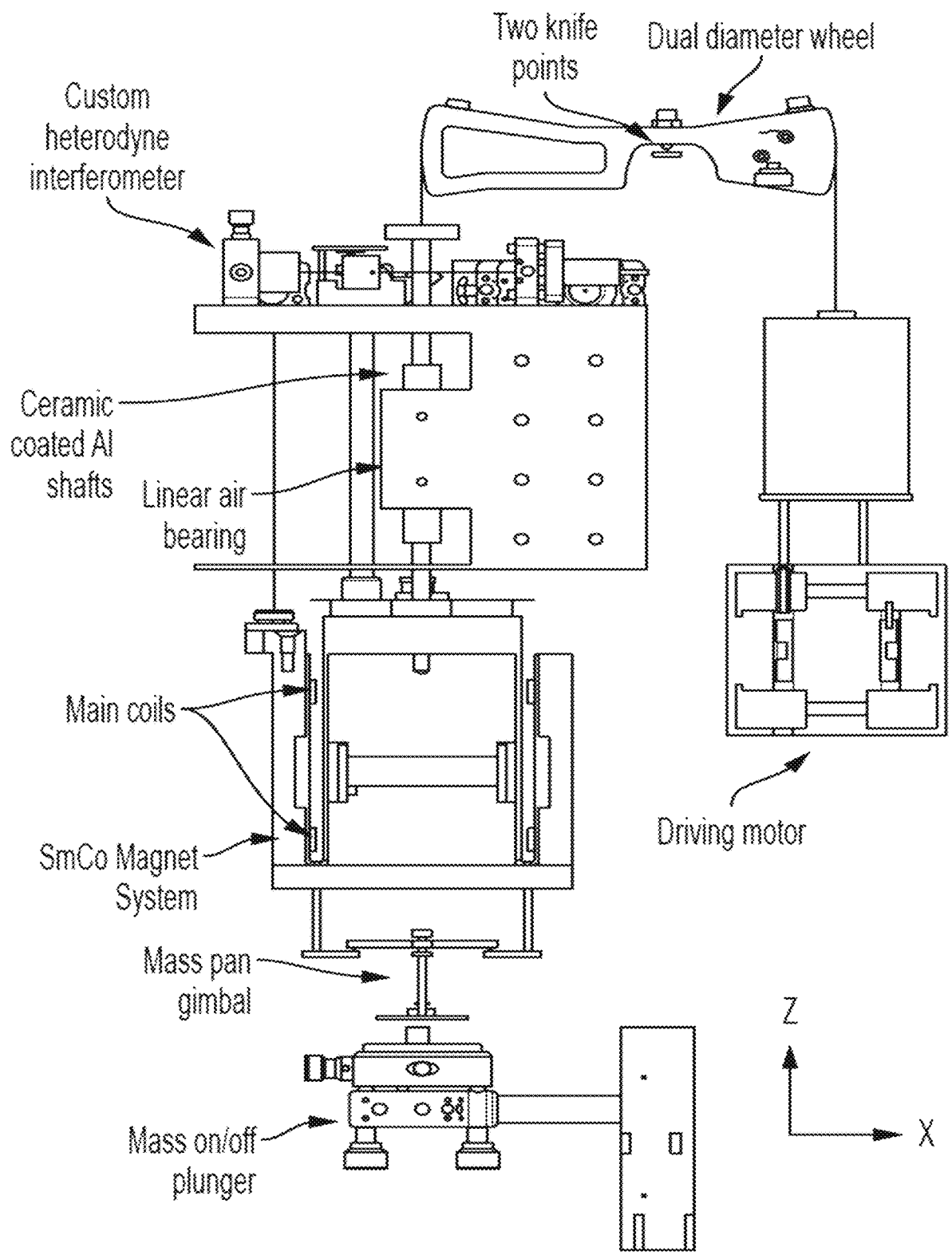
FIG. 14 shows an absolute mass balance.

Here, the absolute mass balance was constructed and measured 57 cm tall and 30 cm in diameter and included: a 'main mass side' (MMS) that included components relevant to velocity and force mode; and a 'counter mass side' (CMS) that included a driving motor, as shown in FIG. 14, wherein a cross-sectional view magnets and coils are shown for the absolute mass balance. The main mass side includes features to the left of the knife points, and the counter mass side includes features to the right of the knife points.

Figure 15:
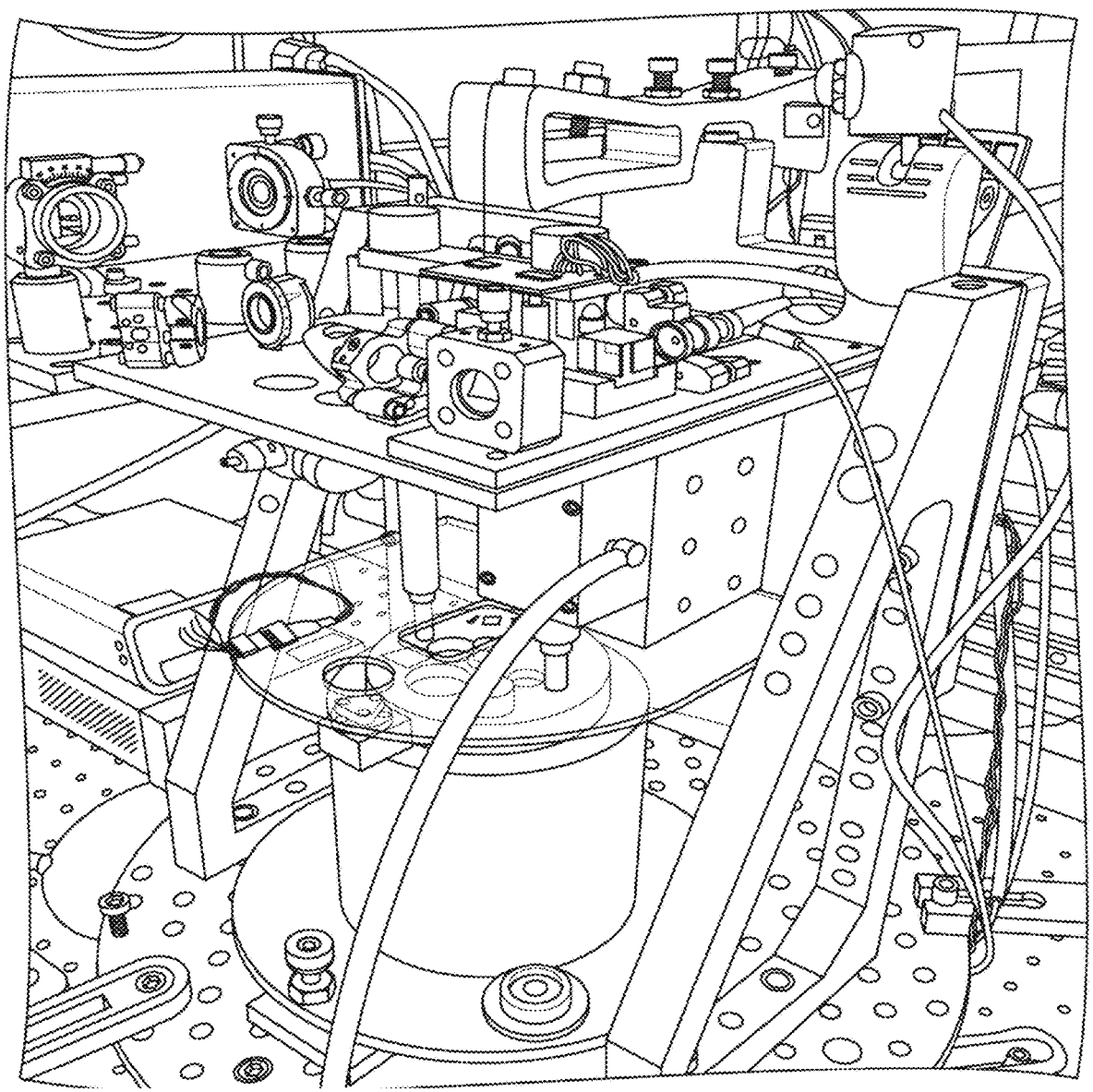
FIG. 15 shows an absolute mass balance.

With reference to FIG. 14 and FIG. 15, starting from the top of the absolute mass balance, a dual-diameter truncated wheel pivots about a two-point contact, forming a line contact, referred to as "knife points." The two pivot points are nonmagnetic alloy points, and each knife point rests on a polished sapphire disk. The simple design of the two knife points provide a straight-line contact without a precision knife edge.

The truncated wheel looks like a beam but behaves as a wheel. The motion of the hanging coils along the Z-axis is constrained by rotation of the wheel about the Y-axis. The MMS beam arc has a smooth, curved surface with a radius 1.4 times that of the CMS arc where both arcs are concentric.

This radius mismatch allows for increased space on the MMS without increasing the form factor of the entire apparatus. Each knife point is rigidly attached to the end of a screw inserted through the center of the balance beam. Adjusting the depth of each screw allows aligning the rotational degree of freedom (DOF) about the X-axis and translational DOF in the Z-axis. This adjusts a location of the truncated wheel's center of gravity as well as aligning its geometric center to the rotation center of the knife points.

The MMS electromagnet system includes two coils with 3253 turns and mean diameter of 73 mm, wherein each is wound from magnet wire with a diameter of 0.06 mm. The MMS permanent magnet includes a single SmCo magnet disk, wherein a magnetic flux is guided by a mild steel yoke. The magnetic flux is guided radially through two air gaps for interaction with the two coils. The magnetic flux density through the air gaps are measured to be about 0.4 T.

The coil is rigidly connected to two parallel ceramic coated aluminum shafts and is suspended from the MMS of the beam via a titanium wire. One of the parallel shafts is guided by an air bearing operating at about 240 kPa above atmosphere. Air bearings for both shafts can be included but parallelism alignment should overcome effects of over constraining. Two shielding plates were bolted above and below the air bearing to reduce noise from the exhaust. A force mode measurement was performed with varying input pressures ranging from 240-700 kPa. Although higher pressures resulted in an increase in noise, the overall mass determination for each pressure level was consistent. Air exhaust is a constant offset force common in both the mass on and mass off states during force mode. A vertical tube shielded laser paths from small refractive index fluctuations caused by exhaust air. The lab temperature, humidity, and pressure fluctuations were measured by an environmental sensor placed next to the magnet for buoyancy and refractive index corrections, and the effect of each contributed relatively less than $1 \times 10^{-6}$. Suspended from the bottom of the coil was a mass pan gimbal, and a piston loaded and unloaded the test mass.

The CMS included a coil mounted below a copper tube (a dead mass to account for the mass on the MMS), suspended by two filaments of the same wire as the MMS. NdFeB magnets interacted with the copper tube and were eddy current dampers that suppressed pendulum modes of the CMS hanging assembly. The CMS coil hung inside a closed-circuit NeFeB/mild steel magnet system.

A dual frequency 2.83 MHz Zeeman-split laser was a light source for the Michelson heterodyne interferometer that measured and controlled displacement of the main coil along Z. The measurement laser beam of the interferometer projects onto a flat mirror mounted and centered on a top surface of the coil former adjustable in angle about X and Y. Because the angular degrees of freedom of the coil were constrained by the air bearings, a simple flat mirror was chosen instead of a retroreflector. The reference arm projected onto a similar mirror system mounted to the top edge of the magnet. This location minimized the optical path difference between the two arms and provided common mode rejection of mechanical vibration between the coil and magnet. The interferometer signals were read through two time interval analyzers (TIA). One TIA provide continuous position and time readout, and the second TIA provided the measurement readout for velocity when triggered. A horizontal displacement sensor (HDS) included a separate laser beam that reflected from a corner cube mounted off-center of the coil former onto a 2D position sensor for monitoring parasitic X and Y motions of the coil during the velocity trajectory and as an aid for aligning the trajectory to gravity.

The coils of the absolute mass balance were connected to a 26-bit current source through a relay box ultimately controlled by a data acquisition unit. In velocity mode, the induced voltage is measured with an voltmeter. In force mode, the full voltage drop produced by the weighing current traversing a 1 kΩ calibrated resistor was measured. Measurement and timing triggers were controlled by a field programmable gate array (FPGA). A global positioning system (GPS) receiver produced a 10 MHz signal as a timing source for the FPGA and TIAs.

Figure 3:
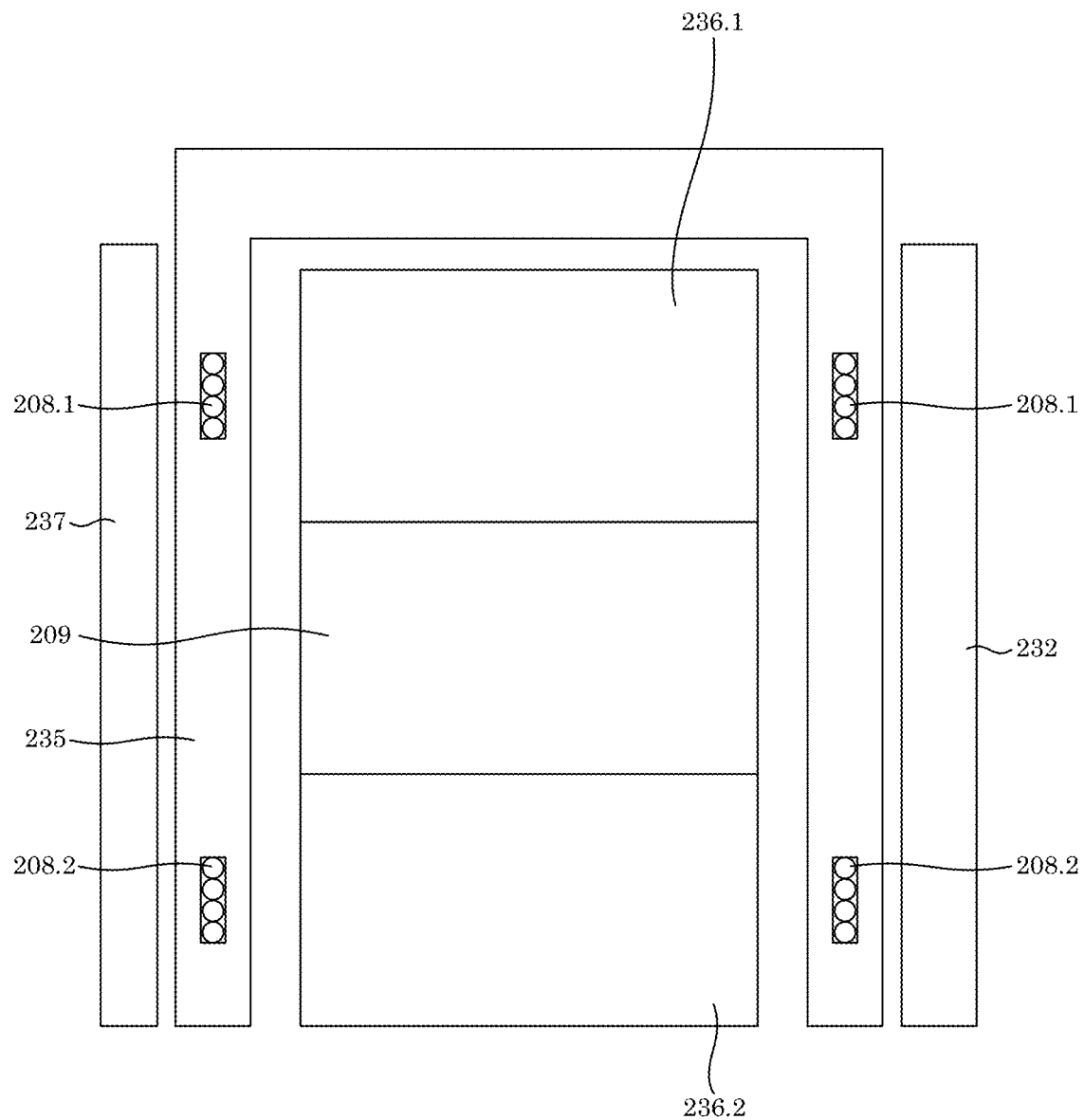
FIG. 3 shows a cross-section of a magnet system, wherein two coils wound on a coil former are with their windings connected in series opposition, and two halves of an outer yoke is shown as a single member.

With regard to magnets, the magnet system for the absolute mass balance included a single SmCo disk with a 12.7-mm height and 50.8-mm diameter as a source of the magnetic circuit. Two mild steel cylinders sandwiched the magnet and were concentrically constrained by an aluminum sleeve as shown in FIG. 3. The inner yoke included these three components. Two symmetric tubes made from the same steel were stacked and locked to each other via three dowel pins and were the outer yoke assembly. Both the inner and outer yoke assemblies were bolted to an aluminum base as a bulkhead that provided tip, tilt, and vertical translation.

Figure 16:
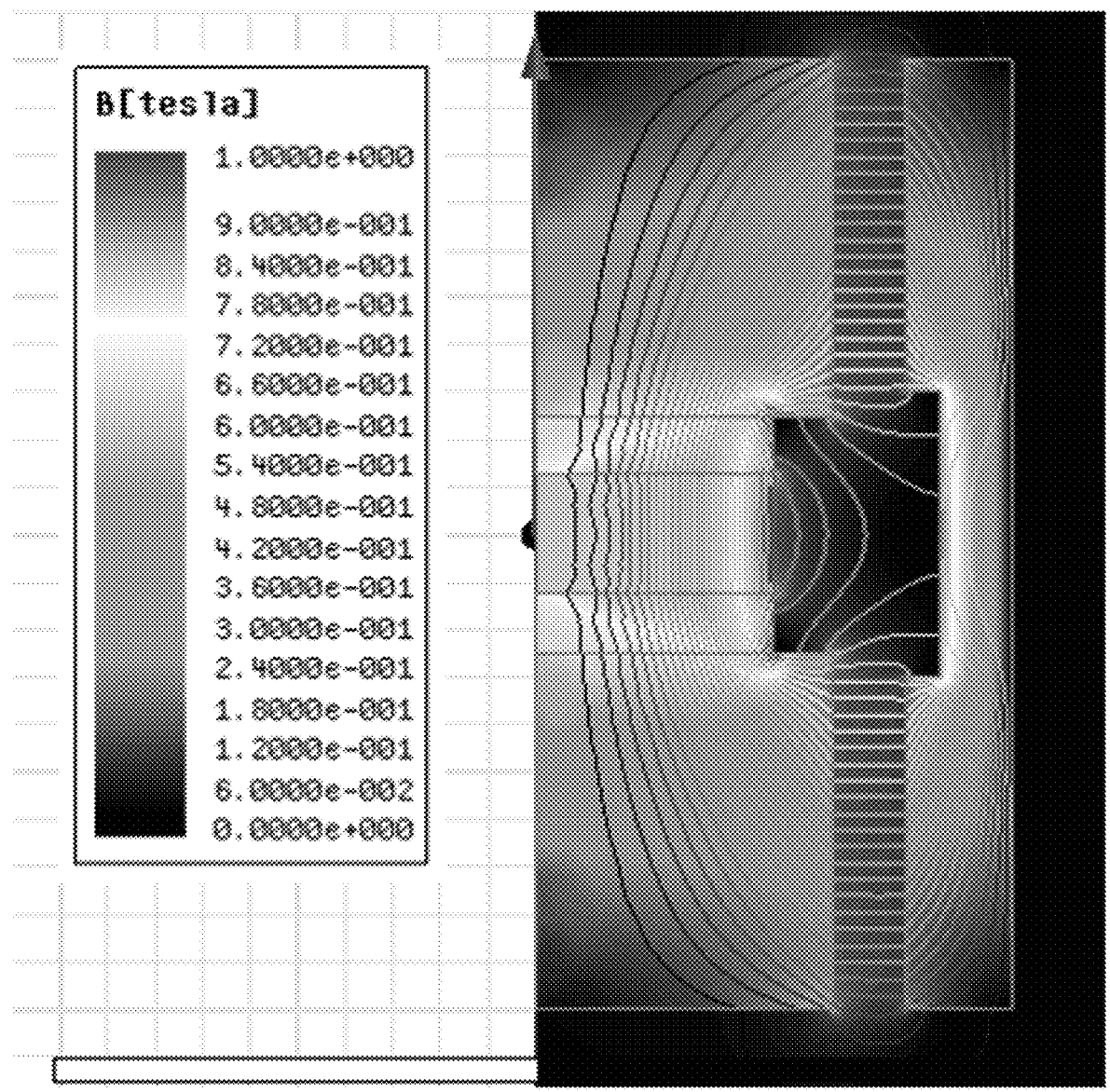
FIG. 16 shows a finite element simulation of magnetic flux density through top and bottom air gaps of half of a magnet, wherein the field where the coil resides in weighing mode is approximately 0.4 T.
Figure 17:
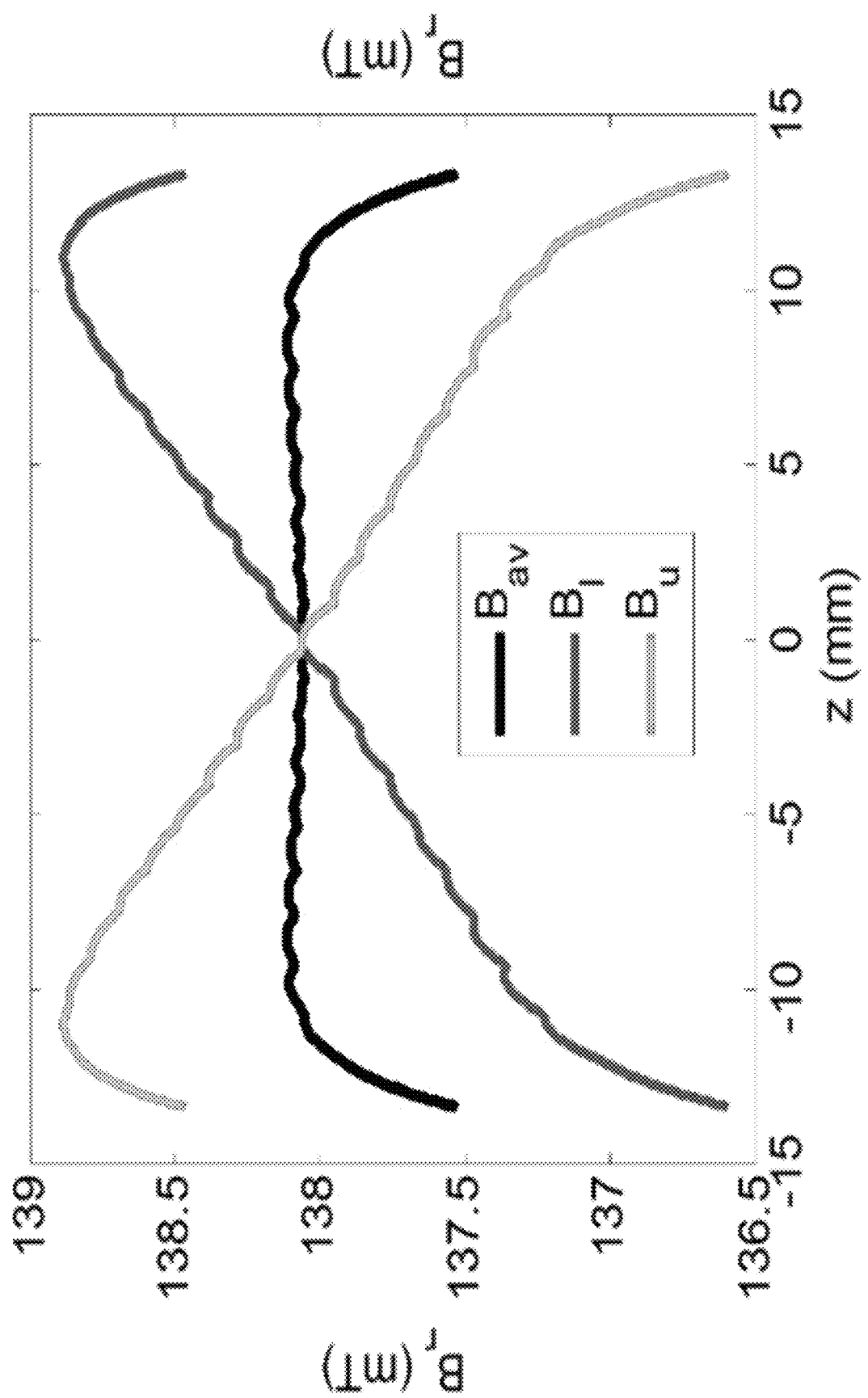
FIG. 17 shows a magnetic flux density profile of an upper air gap (B_u), a lower air gap (B_l), and an average of the two (B_av) versus vertical position of the coil Z, wherein an MMS coil includes two individual coils electrically connected in series opposition so a theoretical profile reflects a shape of B_av with a local minimum at Z=0.

The upper and lower 7.6 mm wide and 35.6 mm tall air gaps contained the radial magnetic field and guided linearly increasing or decreasing magnetic flux densities with respect to Z as seen in FIG. 16 and FIG. 17. The combined magnetic flux density curve was uniform in the neighborhood of Z=0.

The magnet can include a monolithic tube as the outer yoke. Due to manufacturing and assembly procedure asymmetries of both the magnet and the coils, the combined field profile had a slope of 0.075 Tm/mm. Mass determinations can be sensitive to deviations about the weighing position. To achieve a flat spot in the profile, a different outer yoke was fabricated as two separate pieces, wherein the assembly procedure was symmetric, and no yoke pieces were magnetized more than once. Another attempt was altering the reluctance of the bottom half of the outer yoke with an external magnetic field. A flat field near Z=0 was provided by shimming the height of the inner yoke assembly by 2 mm relative to the outer yoke. This led to a measured magnetic field profile shown in FIG. 19, wherein the slope was less than 0.004 Tm/mm or in relative terms was $2.3 \times 10^{-8}$/m near Z=0. The balance controls held a weighing position at Z=0±0.5 m.

The open top/bottom magnet system may magnetic flux near the unguided regions. The test mass can experience a systematic force from the stray magnetic field and its gradient. The mass pan hung approximately 50 mm below the bottom surface of the magnet. An OIML class $E_2$ 10-g stainless steel mass could experience a force equivalent of a 12 mg mass due to magnetic susceptibility of the material. A field cancellation procedure included adding a 5-DOF adjustable magnet underneath the mass pan to negate the field at the mass location and reduced the magnetic field gradient to zero.

To align the absolute mass balance, verticality of the absolute mass balance, HDS, and interferometer was achieved. The magnet, which can be independently tilted, was aligned to be vertical. The direction of the interferometer and the HDS laser beams were aligned to be vertical, defined by g, with reference to an alcohol pool. The verticality of the measurement laser of the interferometer was adjusted to be within 200 rad due to the length of the optical lever. The trajectory of the coil was made vertical by adjusting the absolute mass balance and HDS to align tog.

Figure 18:
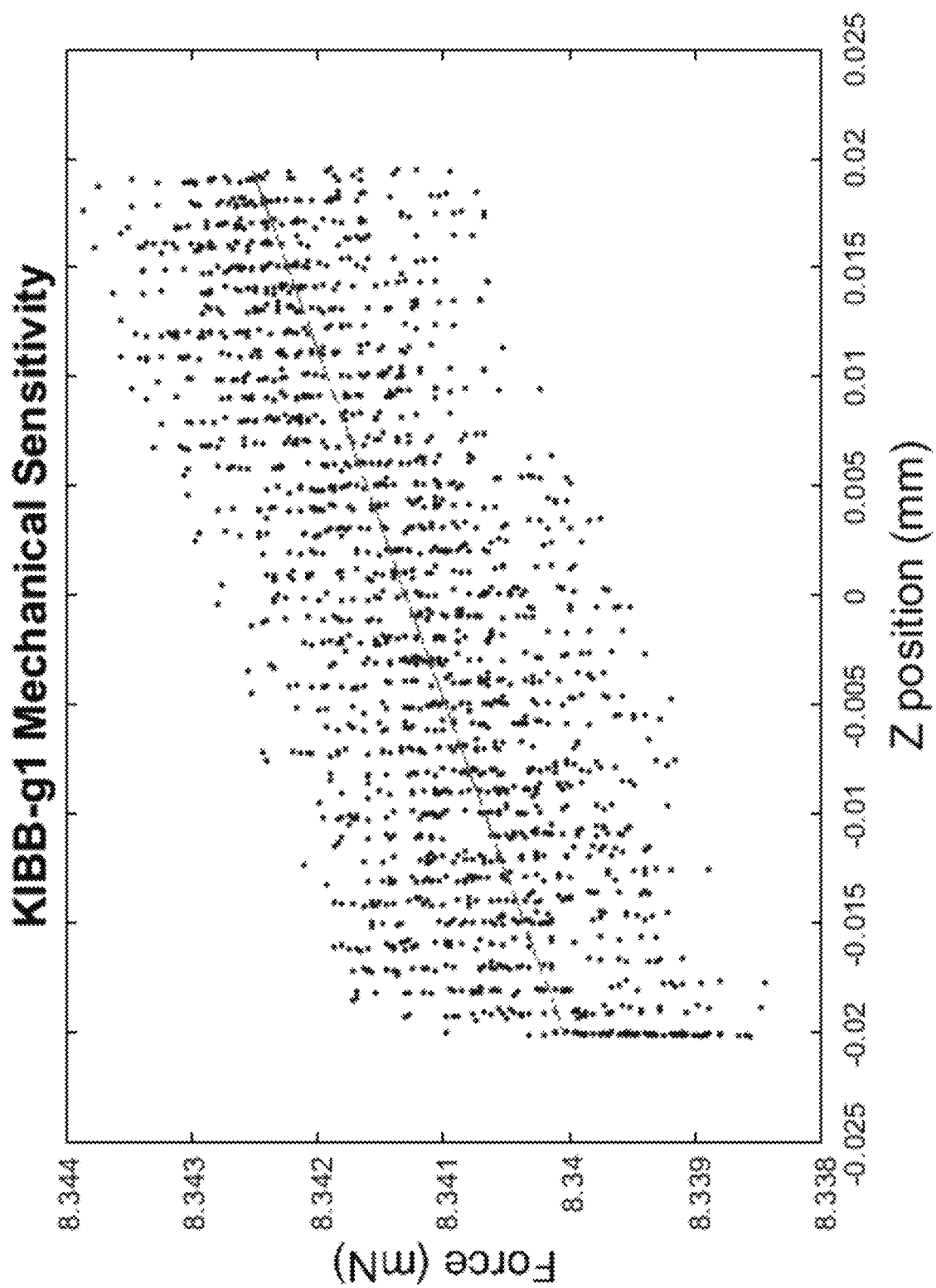
FIG. 18 shows measured data of mechanical balance sensitivity between Z=−0.02 mm to Z=0.02 mm; wherein a force change as a function of Z position is about 0.05 N/m.

Sensitivity of the absolute mass balance was adjusted by shifting the center of gravity of the balance wheel. Two threaded brass masses attached to the CMS of the balance beam allowed to translate in X and Z provided such adjustments. Sensitivity of the absolute mass balance was measured to be about 0.05 N/m (or 5 nN/rad with respect to the wheel angle) near the weighing position, depicted by FIG. 18. The force mode controller held the position of the coil to within 0±0.5 m.

With regard to measuring and data analysis, once alignment was complete, an acrylic dome was placed over the absolute mass balance to shield the absolute mass balance from air currents. A hole in the dome provided communication for the interferometer laser beam. A the mass of a copper cylinder with a value of 10.164780(5) g (k=1, calibrated by the NIST Mass and Force Group) was subject to determination by the absolute mass balance.

Figure 19:
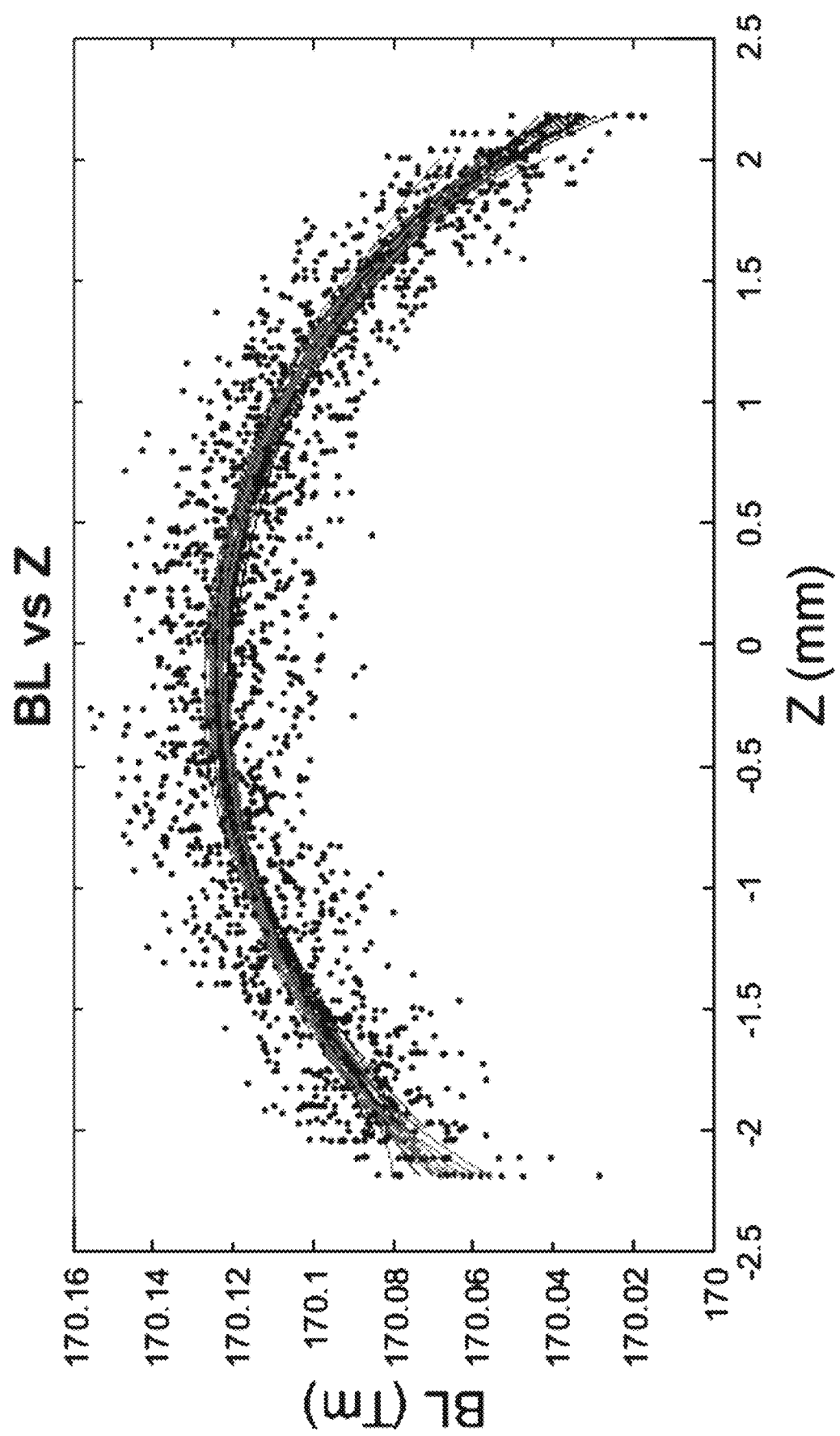
FIG. 19 shows 29 up/down sweeps superimposed on top of each other in a single velocity mode data set; wherein BL is plotted against Z position of the coil; induced voltage was measured at 2 NPLC, 1 mm/s from Z=−2.2 mm to +2.2 mm, and a least squares regression was applied to each sweep.
Figure 20:
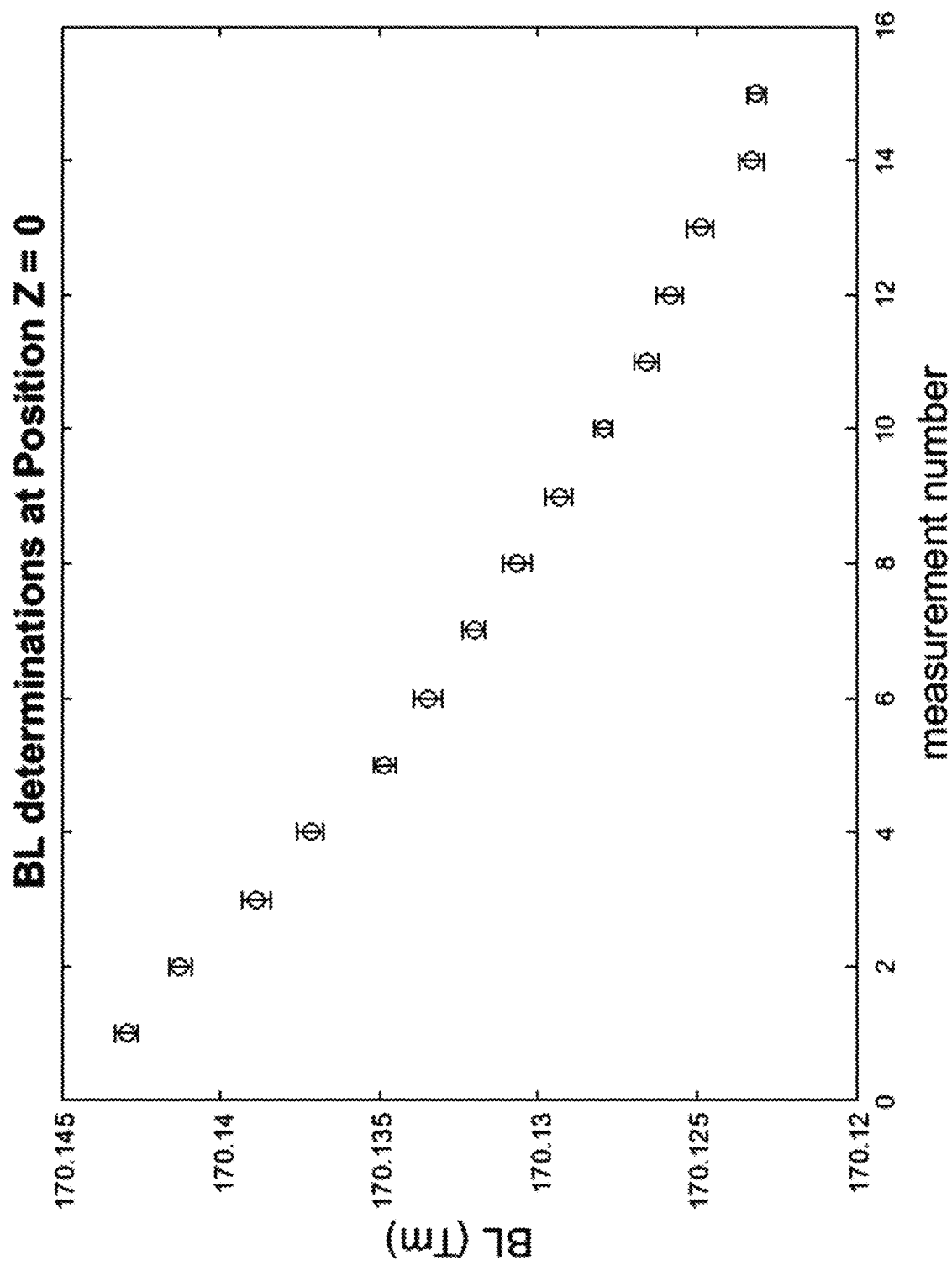
FIG. 20 shows BL determinations of a full measurement; a relative statistical uncertainty of each determination was, on average, $2 \times 10^{\wedge}(-6)$ (k=1), wherein overlying drift was a change of magnetization due to temperature fluctuations.

Velocity mode operates with the 10 g mass disposed on the mass pan and the absolute mass balance balanced. The measurement started with 14 up and 15 down velocity sweeps with a constant velocity of 1 mm/s while sampling the DVM every 2 power line cycles (NPLC) or 33 ms. These parameter values were chosen based on examining the power spectrum of velocity noise and a separate parametric study between differing NPLC and velocity values. The FPGA triggered the sampling of the TIA and DVM. Each voltage measurement was bracketed by 17 position and time readings, wherein each set was averaged to a single position and time. The velocity during the voltage measurement was determined by a difference of two consecutive position readings divided by the sample time. From the voltage and velocity data pairs, a quotient was calculated as BL. Each sweep included 60 BL measurements each with a Z position ranging from Z=±2.2 mm. For this data set, a least squares regression was performed. FIG. 19 shows data of 29 up and down sweeps superimposed on each other, wherein solid lines show polynomial fits of the empirical data. FIG. 20 shows the average of the BL values extracted from the polynomial fits at Z=0 for each velocity mode set over the span of 4.5 hours. Force mode measurements occurred between each of these points.

Figure 21:
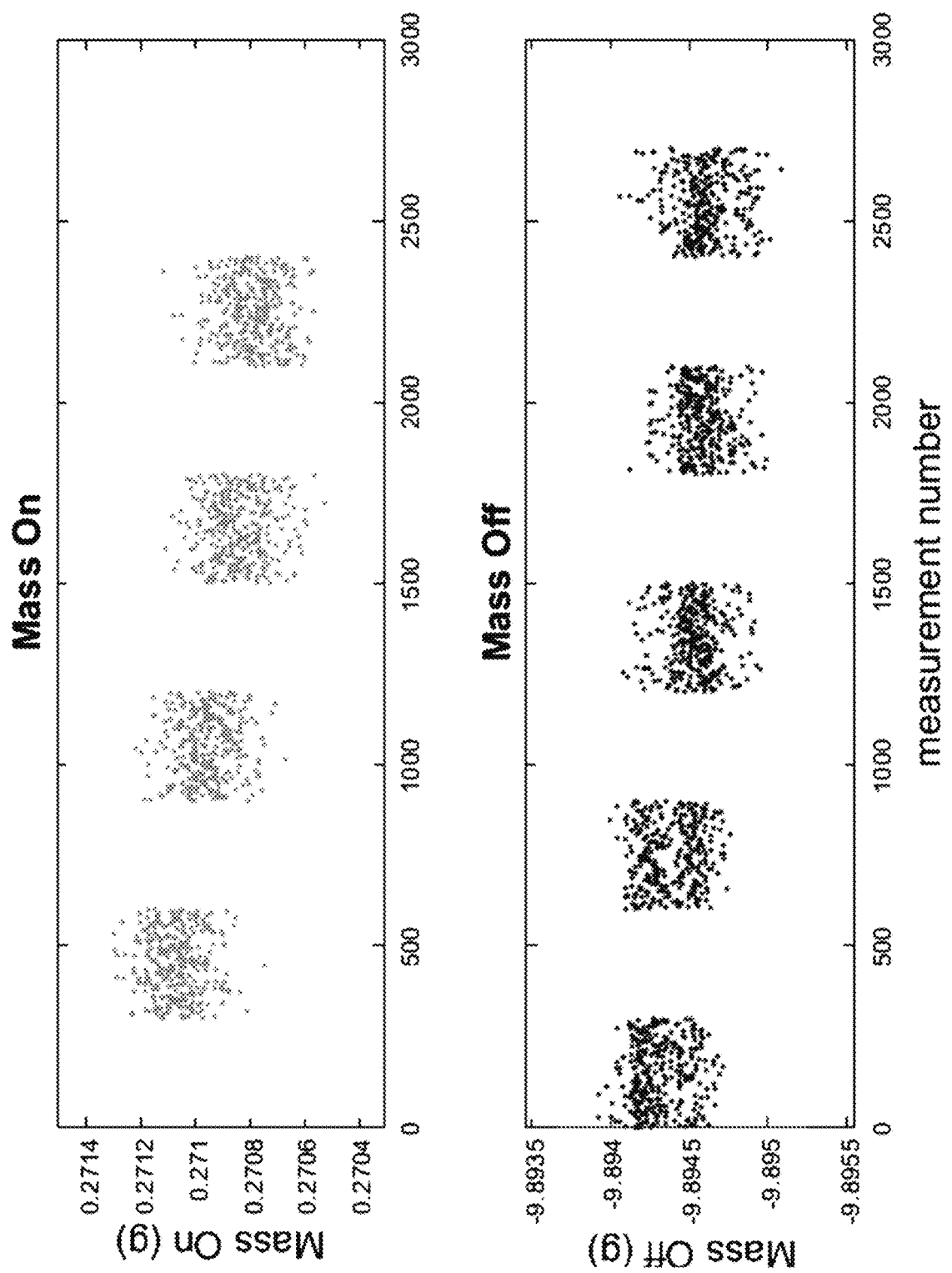
FIG. 21 shows raw force mode data. Mass imbalance experienced by an absolute mass balance converted from voltage to grams via an interpolated value of BL from bracketing velocity mode measurements is plotted; top: four mass on measurements. Each cluster is 300 data points taken over 30 seconds. Bottom: five sets of mass off measurements with the same amount of data points and time duration. All clusters had relative uncertainty of about $2 \times 10^{\wedge}(-5)$ (k=1)

After a set of velocity mode measurements, the system toggled to force mode, and the balance was servoed to Z=0, wherein the maximum of the BL curve resided. A motorized translation stage first removed the mass, and the perturbation due to this process was suppressed with tight control gains. The balance then underwent a hysteresis erasing procedure where the balance followed a decaying sinusoidal trajectory with an initial amplitude larger than that of the perturbation caused by the mass removal. This occurred because the pivot points were not ideal, frictionless surfaces and had a bias restoring force that depended on a direction and amplitude of the excursion from mass exchanges. After the erasing procedure, controller feedback switched to a set of gains optimized for current noise. After some settling time, 300 current measurements were taken, once every power line cycle. The process was repeated for a mass on measurement. In total, a set of 9 mass on-then-off measurements were taken per force mode set as shown in FIG. 21. The weighings were asymmetric, i.e.:

$$|M_{off}| \neq |M_{on}| \tag{4}$$

due to mechanical limitations of the absolute mass balance.

Figure 22:
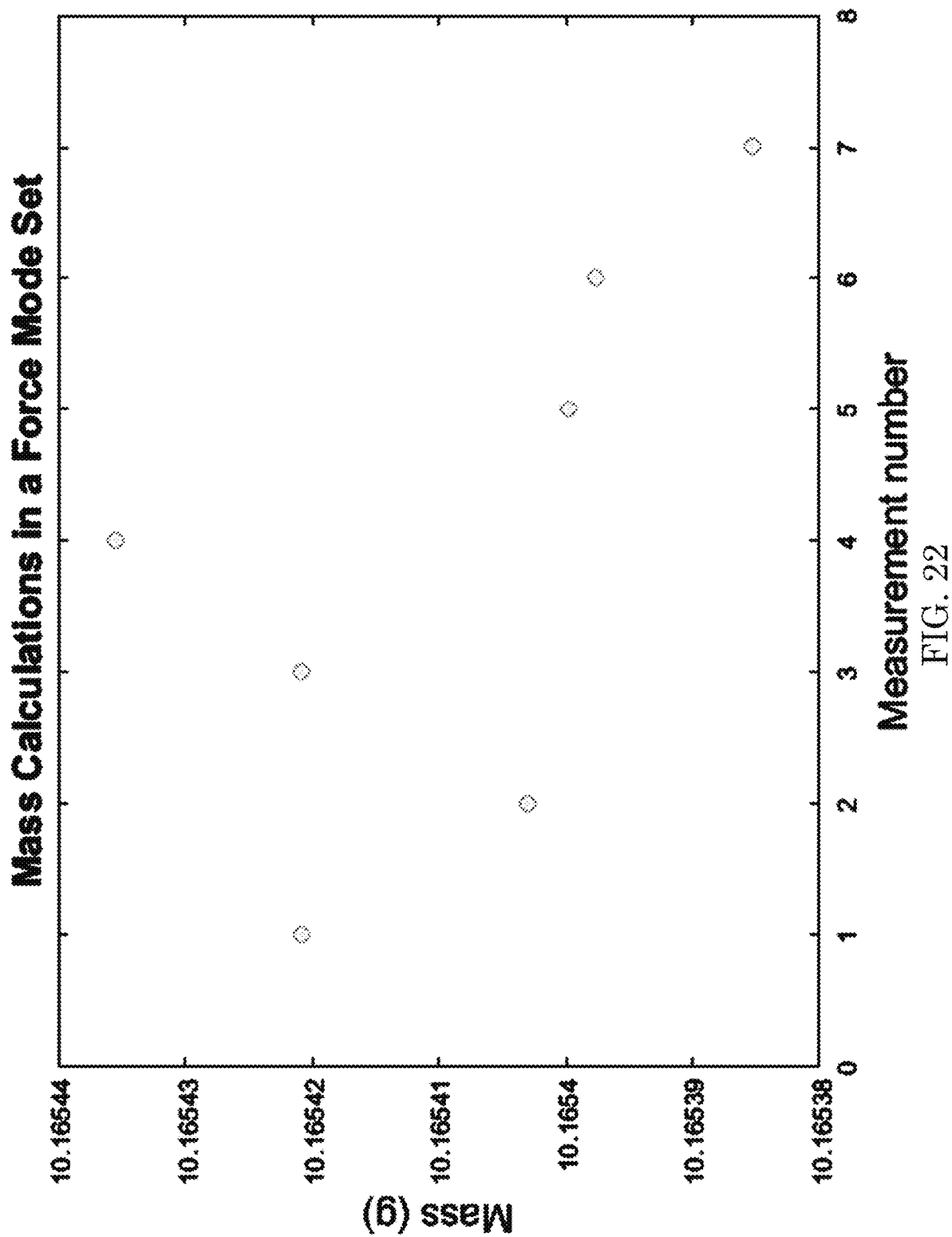
FIG. 22 shows mass calculations in a force mode set, wherein relative statistical uncertainty of each force mode set was on average $5 \times 10^{\wedge}(-6)$ (k=1)

After conclusion of a measurement of 15 velocity mode and 14 force mode sets, the force mode voltage measurements were converted to mass via a linearly interpolated BL value from bracketing velocity mode sets that provided 7 mass calculations per force mode set as shown in FIG. 22. The first mass calculation was:

$$\frac{M_{off1} - M_{off2}}{2} - M_{on1} \tag{5}$$

Figure 23:
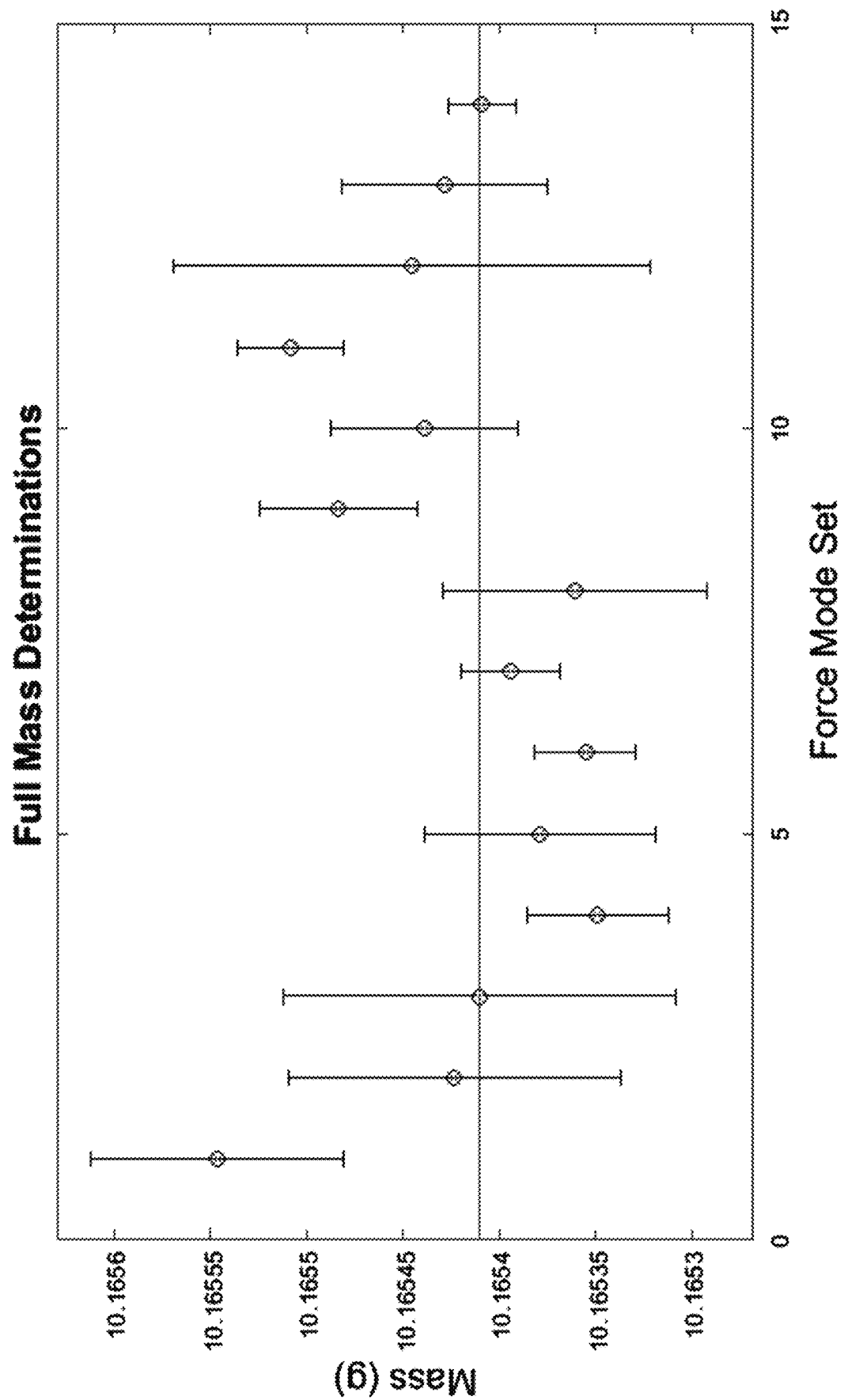
FIG. 23 shows mass determinations for a copper cylinder with a mass value of 10.164780(5) g, wherein weighting the data provided a value of 10.16541 g (horizontal line) with a relative statistical uncertainty of $1.2 \times 10^{\wedge}(-6)$ (k=1), and the uncertainty is subject to multiplication by an expansion factor of 1.47.

The second mass calculation was:

$$M_{off2} - \frac{M_{on1} - M_{on2}}{2} \tag{6}$$

and so on to remove linear time-dependent drift of the magnetic field due to temperature fluctuations since mass on and mass off were measured at different times. FIG. 21 shows a force mode set. A full measurement set of mass determinations is shown in FIG. 23.

Some systematic uncertainties had relative effects at or below $1 \times 10^{-6}$, i.e., local acceleration of gravity, laser wavelength and frequency, refractive index and buoyancy changes due to environmental fluctuations, resistor and DVM drift, and the like. Temperature, air pressure, and humidity were monitored, and an index of refraction correction for the laser wavelength was applied. In FIG. 23, fourteen data points are shown with statistical uncertainties. The weighted mean of the data has a relative statistical uncertainty of $1.2 \times 10^{-6}$. The $\chi^2$ is 28 for N−1=13 degrees of freedom. Individual uncertainties were increased by $\sqrt{\chi^2/(N-1)} = 1.47$. This led to a relative statistical uncertainty of the mean of $1.7 \times 10^{-6}$. The data in FIG. 23 show a non-stationary pattern. The data indicates the precision of the particular absolute mass balance had an uncertainty of $1.7 \times 10^{-6}$ for the 10-g mass, but the difference between the measured value and true value was $6.2 \times 10^{-5}$.

Example 2. Performance of the KIBB-g1 Tabletop Kibble Balance

In this example, equation numbers start again at (1).

An absolute mass balance (tabletop-sized Kibble balance) was constructed and directly realized mass at the gram-level range with uncertainties on the order of parts in $10^6$. The masses of a nominally 5-g and 1 g weight were determined with 1-σ standard uncertainties of 9.0 g and 6.7 g, respectively. The corresponding relative uncertainties were $1.8 \times 10^{-6}$ and $6.3 \times 10^{-6}$.

OIML class $E_2$ weights, typically used for calibrating weighing instruments, ranging from 1 g to 10 g undergo scheduled calibrations by accredited metrology institutes. The absolute mass balance directly measured small masses and realized the unit of mass with the same level of uncertainties associated with a set of calibration weights. Advantageously, operating at this level of relative uncertainty relaxed demand for direct connection to quantum electrical standards, gravimeters, and high vacuum environments.

The absolute mass balance made absolute mass measurements by comparing the weight of an object to a frequently calibrated electromagnetic force determined by electrical quantities that involved two modes of operation, velocity mode and force mode. Velocity mode was based on Faraday's law of induction. A coil of wire length L was moved at a vertical velocity v through a magnetic field of flux density B so that a voltage V was induced. The induced voltage was related to the velocity through the flux integral BL:

$$V = BLv \quad (1)$$

Force mode was based on the Lorentz force. The gravitational force on a mass m was counteracted by an upward electromagnetic force F generated by the same coil, now energized with a current I in the same magnetic field:

$$F = BLI = mg \quad (2)$$

where g is the local gravitational acceleration.

An expression that equates electrical and mechanical power leading to a solution for mass was obtained by combining equations (1) and (2):

$$VI = mgv \Rightarrow m = \frac{VI}{gv} \quad (3)$$

Since the absolute mass balance provides relative uncertainties on the order of a few parts in $10^6$, the Planck constant makes an appearance for absolutely calibrating the voltmeter and resistance standard used for electrical measurements.

Figure 24:
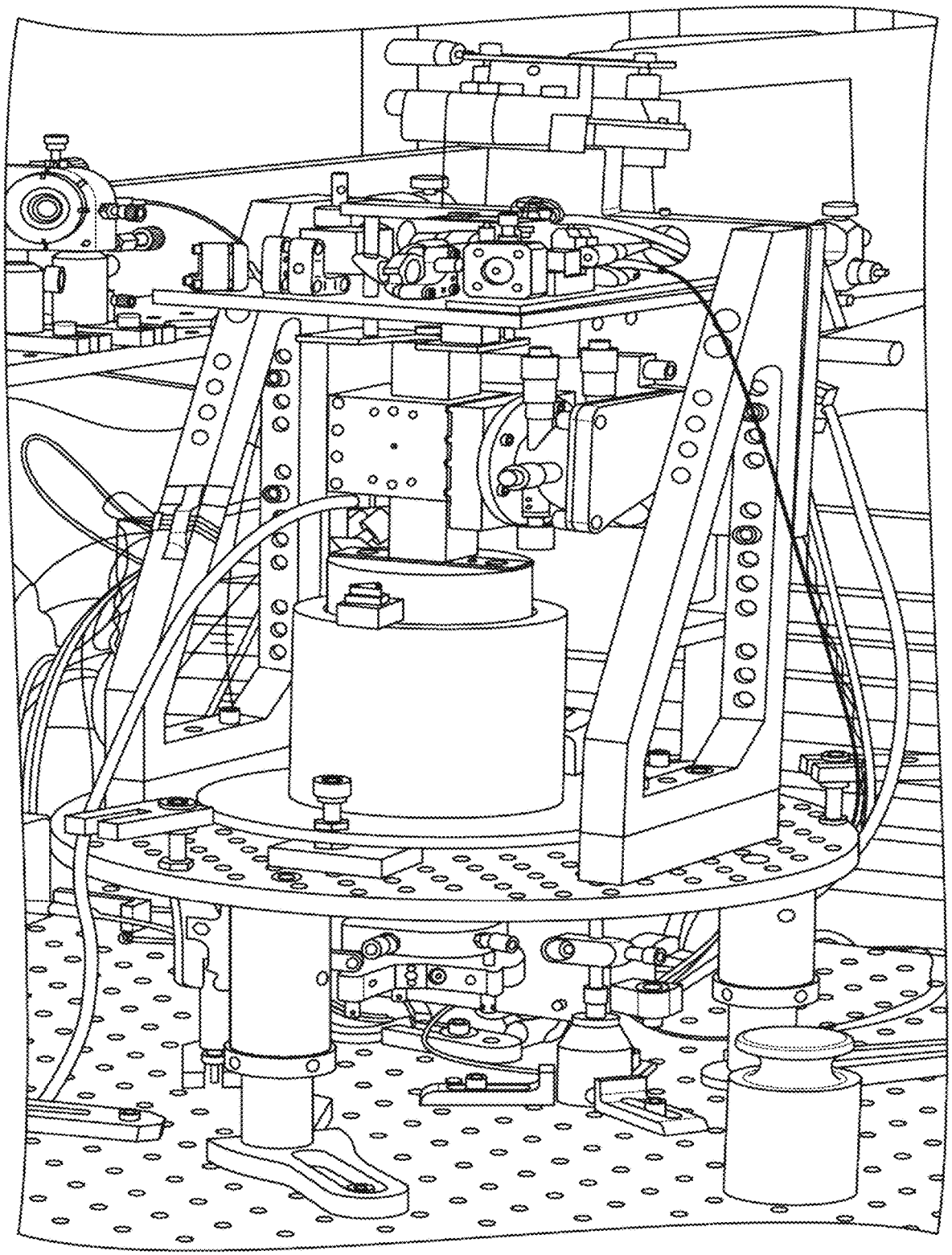
FIG. 24 shows an absolute mass balance 200.

The absolute mass balance was 57 cm tall and fits on a 30 cm diameter circular optical breadboard and included a main mass side (MMS) that included features for velocity and force mode and a counter mass side (CMS) that included a driving motor for velocity mode. With reference to FIG. 1 and FIG. 24, starting from the top of the absolute mass balance, a dual-diameter truncated wheel pivots about a precision ground, tungsten carbide knife edge resting on a diamond-like carbon coated tungsten carbide surface. The truncated wheel behaves as a pulley. The motion of the hanging coils along the Z-axis is constrained by rotation of the wheel about the Y-axis. The MMS beam arc has a smooth, curved surface with a radius 1.4 times that of the CMS arc. Both arcs are centered on the pivot axis. The radius mismatch allows for increased space on the MMS without increasing the form factor of the entire apparatus.

The hanging MMS and CMS assemblies are connected to the wheel via annealed, titanium fibers. The MMS suspension included an air bearing shaft, mass pan gimbal for holding the test mass, and two coils with 3253 turns each and mean diameter of 73 mm wound from magnet wire with a diameter of 0.06 mm. The CMS suspension included a coil and copper tube, a dual purpose deadweight and eddy current damper for suppressing pendulum modes of the hanging assembly. The CMS coil were disposed inside a closed-circuit NdFeB/mild steel magnet system.

The absolute mass balance included an air bearing. The MMS coils were rigidly connected to a square cross section shaft inside an air bearing housing. This linear guidance mechanism provided almost zero-friction, single degree of freedom (DOF) translation. A single degree of freedom constrained coil motion can be insensitive to some misalignments, such as an alignment of the coil motion trajectory to the gravity vector. If the linear trajectory of the coil was misaligned to gravity, this misalignment was present in both velocity mode and force mode, cancelling out.

The square air bearing was disposed on a tip/tilt stage for aligning the trajectory to vertical to reduce risk of contact friction between the air bearing shaft and the bearing surface, e.g., at low air pressure, and to adjust the angle of the coil inside the magnet.

Parametric studies were conducted to examine the effect of the air bearing on the weighing mode measurement noise and bias force. The effect of the temperature of the compressed air on the weighing mode measurement bias force was studied by heating the air with a power resistor on a small copper section of the intake tube where no correlation between mass determinations and intake air temperature was found. The effect of input air pressure amplitude on measurement noise was examined, and the air bearing was operated at 41 kPa above atmosphere.

With regard to optical and electrical features of the absolute mass balance, a dual frequency 2.83 MHz Zeeman-split laser was a light source for the Michelson heterodyne interferometer for measuring and controlling the displacement of the main coil along Z. The measurement laser beam of the interferometer projected onto a flat mirror disposed and centered on the top surface of the coil former adjustable in angle about X and Y. Because the angular degrees of freedom of the coil were constrained by the air bearing, a simple flat mirror was chosen instead of a retroreflector. The reference arm projected onto a mirror mounted to the top edge of the magnet in a similar fashion. This location minimized the optical path difference between the two arms and for common mode rejection of mechanical vibration between the coil and magnet. The interferometer signals was acquired through time interval analyzers (TIA). One TIA was a continuous position and time readout for feedback control, and a second TIA was a measurement readout for velocity when triggered. A horizontal displacement sensor included a laser beam which reflected from a corner cube disposed on a top surface of the coil former and back onto a 2D position sensor for monitoring minute parasitic X and Y motions of the coil during measurements.

Figure 25:
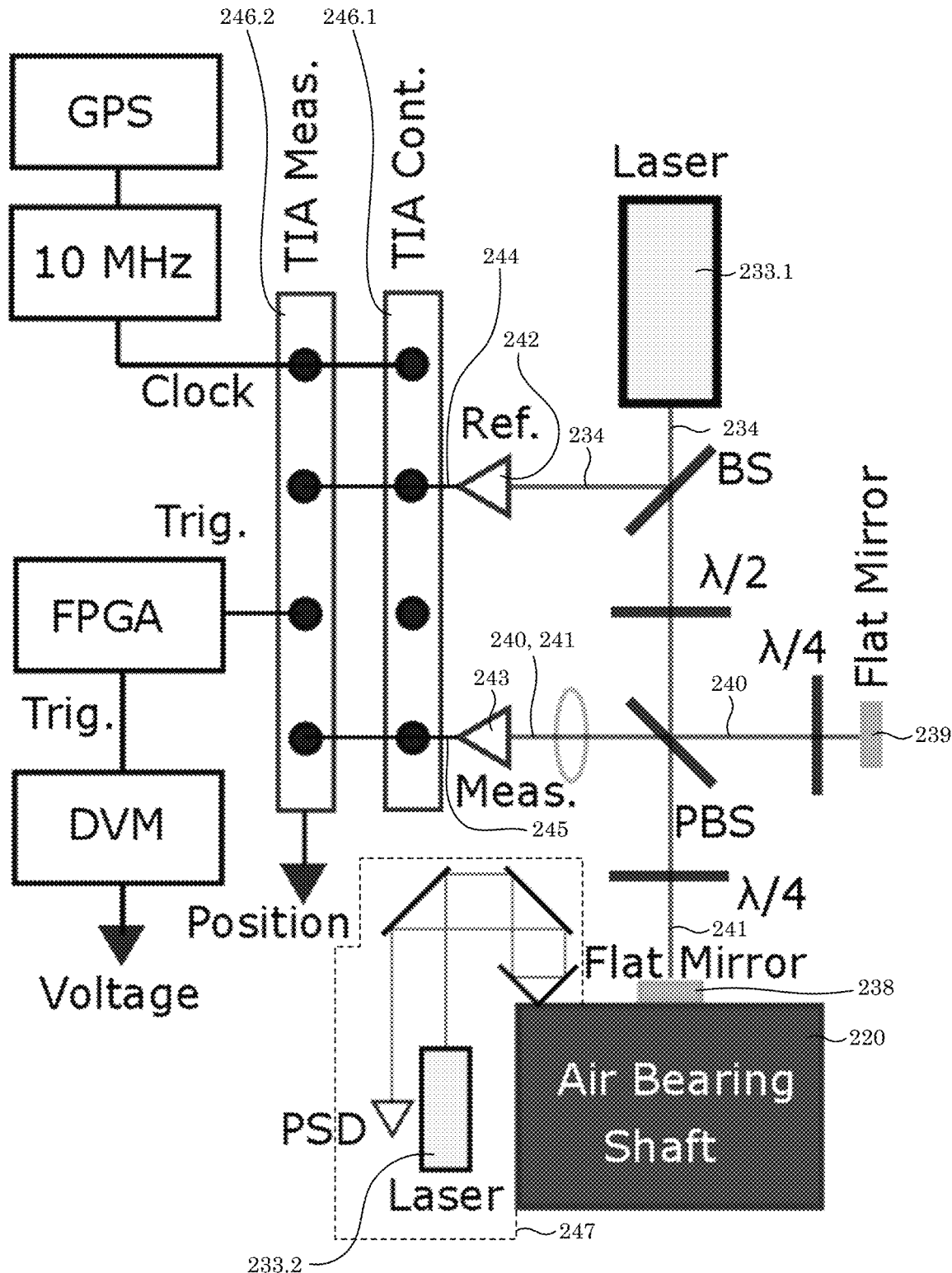
FIG. 25 shows a Michelson heterodyne interferometer that measures motion of an air bearing shaft rigidly mounted to a coil; a reference laser beam and measurement laser beam were directed into receivers connected to two time interval analyzers (TIAs), one of which continuously measured position and time, and the other measured when triggered; a field programmable gate array (FPGA) provided trigger pulses for the measurement TIA and the DVM, wherein TIAs were in communication with a 10 MHz reference clock synchronized with a GPS timer, and a separate laser measured horizontal motions of an air bearing.

The position and voltage measurement schematic is shown in FIG. 25. The two TIAs derived their timebase from a 10 MHz clock synchronized to a GPS signal. A field programmable gate array (FPGA) deployed trigger pulses for sampling both the position and time measurements from the TIA and the voltage measurements from a digital voltmeter (DVM).

The electrical circuit shown in FIG. 26 included four low-noise latching relays. Critical connections are made with PTFE insulated twisted pair wires. Wire segments to both the MMS coils and CMS coil are made from 23 m diameter wires.

With regard to magnetic features of the absolute mass balance, the MMS magnet system included a single SmCo disk that was 12.7 mm in height and 50.8 mm in diameter as a source of the magnetic circuit. Two mild steel cylinders sandwiched the magnet, shown in FIG. 3. The inner yoke assembly included these three components. Two symmetric tubes made from the same steel were stacked and locked to each other via three dowel pins and were the outer yoke assembly. The inner and outer yoke assemblies were bolted to a bulkhead that included an aluminum base plate that provided tip, tilt, and vertical translation.

Figure 29:
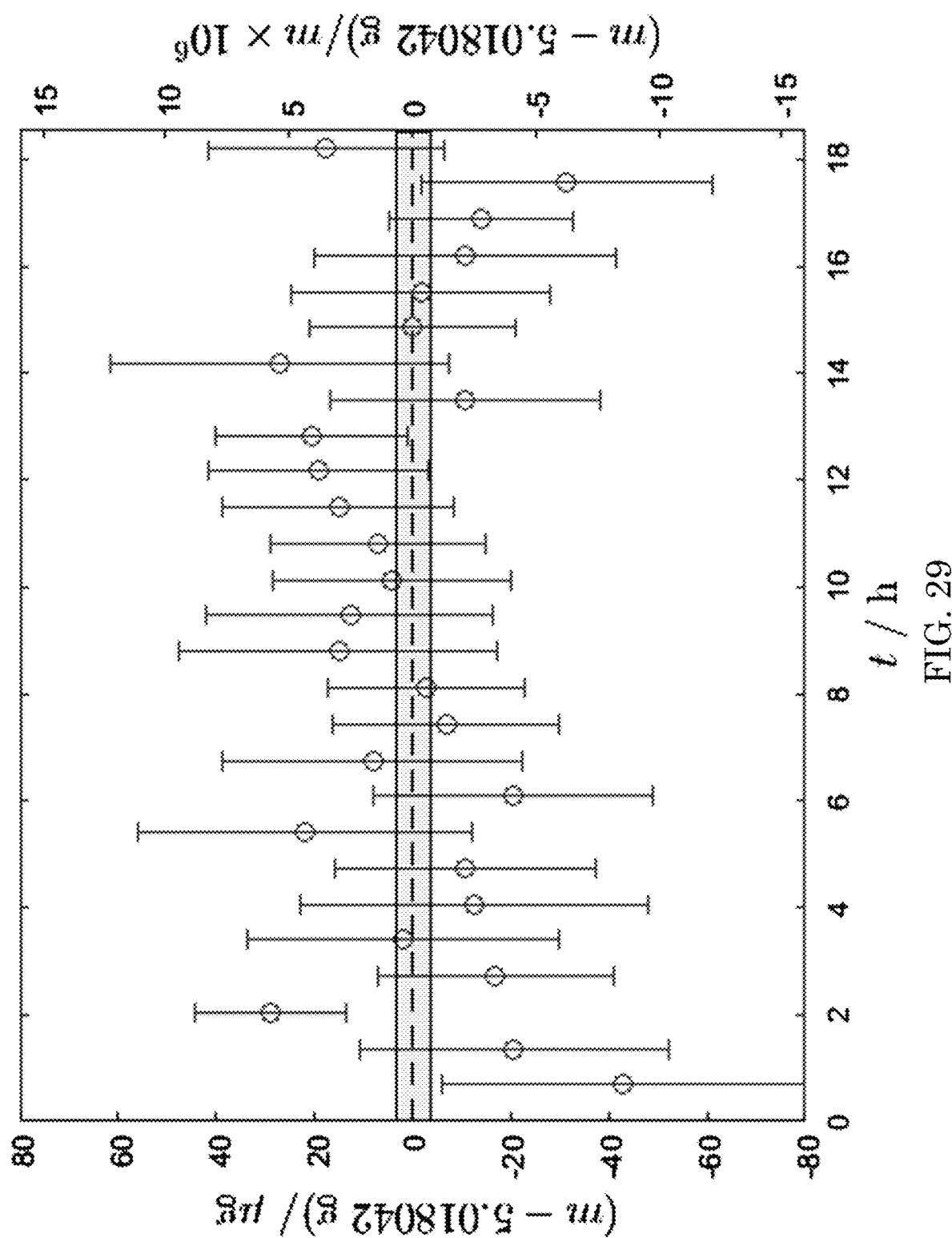
FIG. 29 shows a complete run with 27 mass determinations for a copper cylinder with a mass value of 5.018 042(5) g. Averaging the data gives a value of 5.018 042 g (dashed horizontal line) with a relative statistical uncertainty of $0.7 \times 10^{\wedge}(-6)$ (k=1) (shaded band). The measured value was determined to be $0.03 \times 10^{\wedge}(-6)$ lower than the true value and this difference was rounded down to 0.

The upper and lower 7.6 mm wide and 35.6 mm tall air gaps contained the radial magnetic field and guided linearly increasing or decreasing magnetic flux densities with respect to Z as seen in FIG. 16 and FIG. 17. The combined magnetic flux density curve was uniform in the neighborhood of Z=0. Due to asymmetries of the magnet yoke pieces, a magnetic field profile with a slope of $0.7 \times 10^{-6}$/m near Z=0 was measured as shown in FIG. 29. Weighing mode controls were optimized to hold weighing position to within 0.06 m, and the effect of the slope had a minor influence on overall uncertainty. The field can be shaped such that a flat spot is achieved around the weighing position.

The open top and bottom magnet system can leak magnetic flux near the unguided regions. A test mass could be susceptible to a systematic force from a stray magnetic field and its gradient along Z. The mass pan was hung and disposed approximately 50 mm below the bottom surface of the magnet. An OIML class $E_2$ 10 g stainless steel mass disposed on the mass pan experienced an additional force equivalent to a 12 mg mass due to magnetic susceptibility of the material. This effect was characterized by two magnetic force terms as:

$$e_1 = \chi B_{0z} \frac{b_z V}{\mu_0} \quad (4)$$

$$e_2 = \mu_0 M_z \frac{b_z V}{\mu_0} \quad (5)$$

wherein $\chi$ is a volume magnetic susceptibility of the mass; $B_{0z}$ is an absolute magnetic flux density; $\mu_0$ is free space permeability; $M_z$ is permanent axial magnetization; $b_z$ is the field gradient along Z, and V is volume of the mass. The overall force is the sum, $e_1+e_2$.

The absolute magnetic field and the field gradient were measured at the mass pan to be 4.1 mT and 100 T/mm, respectively. A field cancellation procedure of adding a 5-DOF adjustable permanent magnet underneath the mass pan to negate the field at the mass location was successful and reduced the magnetic field gradient to zero, reducing both $e_1$ and $e_2$ to zero. A strong magnet can be disposed proximate to the mass pan. Here, measurements were made with masses made from copper, wherein magnetic forces are negligible.

With regard to determining the mass of the object and data analysis, a blind measurement was conducted with two weights having nominal masses of 5 g and 1 g. The widths were calibrated by comparison with standards traceable to the SI definition of mass. True mass was determined for each weight, meaning that the raw mass readings of each weight, or apparent mass, was corrected for the effects of air buoyancy. Furthermore, each of the weights was calibrated using a weighing design in which the unknown weight was compared with three other weights that had the same nominal mass. The three other weights included a first weight as a restraint or standard mass, a second weight as a check standard, and a third weight whose mass was unknown. Each weight in the design was compared with every other weight so six comparisons (mass differences) were available as listed in Table 1.

TABLE 1

| W1 | W2 | W3 | W4 |
|---|---|---|---|
| 1 | −1 | 0 | 0 |
| 1 | 0 | −1 | 0 |
| 1 | 0 | 0 | −1 |
| 0 | 1 | −1 | 0 |
| 0 | 1 | 0 | −1 |
| 0 | 0 | 1 | −1 | wherein W1=standard weight (restraint), W2=check standard weight, W3=unknown weight #1, and W4=unknown weight #2. The six mass comparisons listed Table 1 form a set of six equations with two unknowns that can be solved using linear algebra. Uncertainties in the restraint and check standard can be incorporated into the design along with the uncertainties in the mass comparator and air buoyancy corrections. The result of the calculation was a mass value for each of the unknowns along with Type A (statistical) and Type B (non-statistical) uncertainties. By incorporating a check standard, statistical tests on the measurement process and results can be performed that provide a measure of confidence.

An acrylic dome was disposed over the absolute mass balance to shield the instrument from air currents. A small hole in the dome provided communication for the interferometer laser beam. An environmental sensor next to the absolute mass balance measured temperature, pressure, and relative humidity for calculating corrections for index of refraction and buoyancy variations.

Velocity mode operated with the measurement mass resting on the mass pan and the MMS heavier by an amount equal to half the measurement mass. The measurement started with 3 up and 3 down velocity sweeps at a constant velocity of 1 mm/s while sampling the DVM every 1 power line cycle (NPLC) or 33 ms with an auto zero between each sampling aperture. These parameter values were chosen based on examining the power spectrum of velocity noise and a separate parametric study between differing NPLC and velocity values. The FPGA triggered the sampling of the TIA and DVM. Each voltage measurement was bracketed by 17 position and time readings, wherein each set was averaged down to a single position and time. The velocity during the voltage measurement was determined by difference of two consecutive position readings divided by the sample time. From the voltage and velocity data pairs, the quotient was calculated as BL. Each sweep included 60 BL measurements ranging between Z=±2.2 mm and was fitted with a second order polynomial as shown in FIG. 29. A mean and standard was calculated for each set of velocity sweeps at Z=0, represented by markers shown in FIG. 30. The measurement of BL determinations was fitted with a fifth order polynomial for which the interpolated values were used in force mode calculations.

Between sets of velocity mode measurements, the system toggled to force mode, and coil position was servo controlled to Z=0, i.e., the weighing position. A motorized translation stage first removed the mass while the balance was controlled. The excursion of the balance beam from the nominal position was suppressed with large control gains. As reference, the balance excursion was approximately ±40 m for a 5 g exchange. The absolute mass balance was then subjected to a knife-edge hysteresis erasing procedure, wherein the absolute mass balance followed a decaying sinusoidal trajectory with an initial amplitude larger than that of the perturbation caused by the mass removal because the knife edge was not an ideal, frictionless surface and incurred a bias restoring force depending on the direction and amplitude of the excursion from mass exchanges. After a 30-second settling time, 200 voltage readings from the weighing current across the measurement resistor once every 100 ms were acquired. The process was repeated for a mass on measurement. In total, 5 mass-on and 5 mass-off measurements were taken per force mode set.

Figure 31:
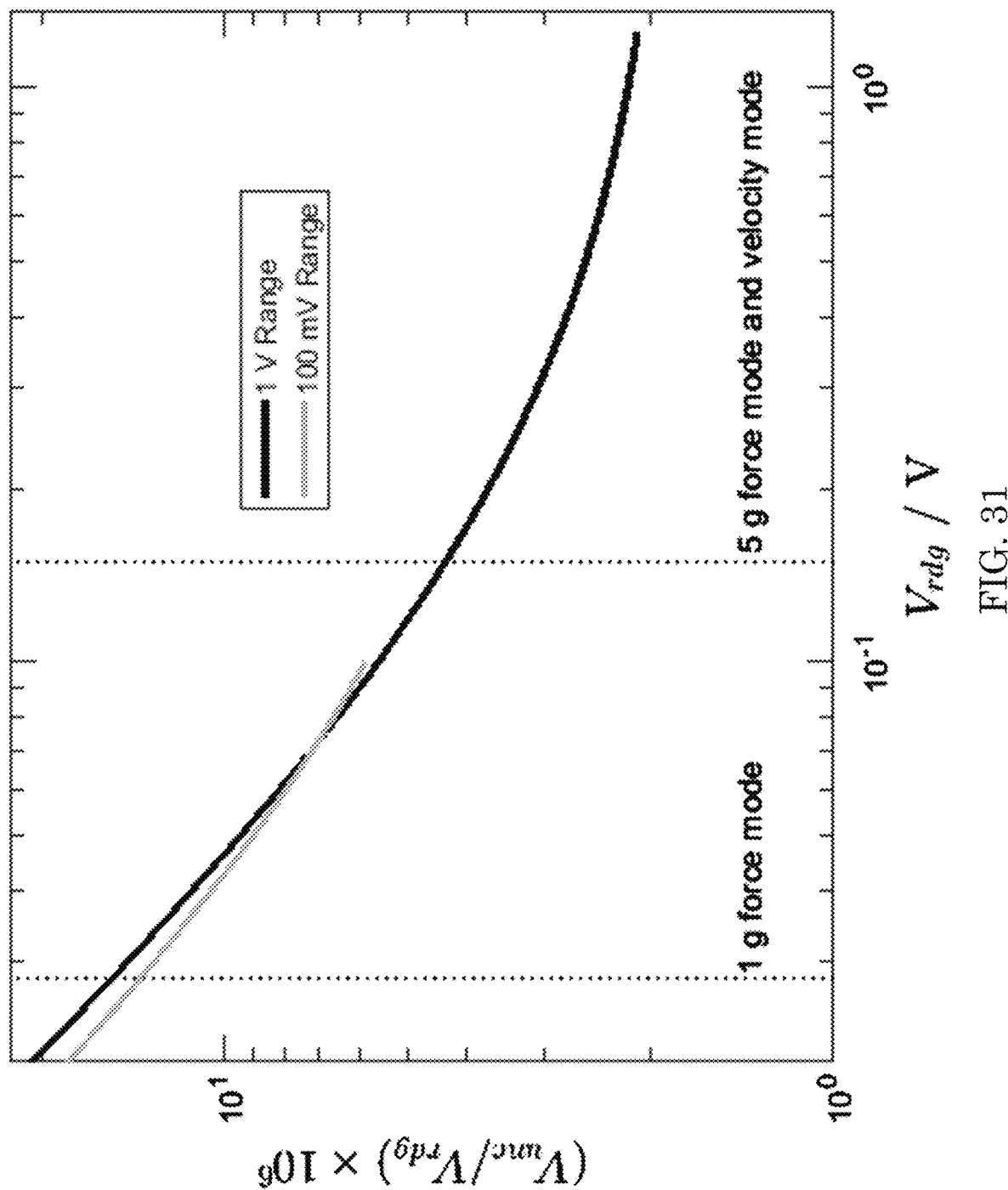
FIG. 31 shows voltage readings and associated relative uncertainties, wherein 1 V and 100 mV ranges are plotted. The left dotted line indicates the voltage level measured for a 1 g determination and the right dotted line indicates the voltage level measured for 1 mm/s velocity sweeps and a 5 g determination.

The set of force mode voltage measurements were converted to 8 mass calculations via an interpolated BL value from bracketing velocity mode sets. Referred to as A-B-A measurements, the mass calculations were:

$$\mu_j = \frac{1}{Rg}\left(\frac{BL_j|V_j| + BL_{j+2}|V_{j+2}|}{2} + BL_{j+1}|V_{j+1}|\right) \quad (6)$$

for j=1 . . . 8, wherein odd values of j were mass-off measurements, and even values were mass-on measurements. The balance offset was such that $V_{on} \approx -V_{off}$. The mass imbalance for the mass-on and mass-off measurement was approximately half the mass to be measured. The imbalance was adjusted by adding or removing wire masses on the CMS before the measurement campaign. The BL value used in each term in equation 6 was a time-specific interpolated value coinciding with each mass-on or mass-off measurement, occurring once every 180 seconds. The A-B-A technique removed linear drifts of the BL caused by temperature changes of the magnet. The average value for a set of mass calculations was one mass determination:

$$m_k = \frac{1}{8}\Sigma_{j=1}^{8} \mu_j \tag{7}$$

wherein k represented the mass determination set number inside the full measurement run. A full measurement run of 5 g and 1 g mass determinations are shown in FIG. 31 and FIG. 32.

The final value for the 5 g and 1 g mass were calculated by the unweighted mean of the mass determinations:

$$m_{final} = \frac{1}{n}\sum_{k=1}^{n} m_k \tag{8}$$

wherein n=27 for the 5 g value and n=41 for the 1 g value. Their corresponding statistical uncertainties were calculated as the standard deviation of the mean:

$$\sigma_{final} = \frac{1}{\sqrt{n}}\sqrt{\frac{\sum_{k=1}^{n}(m_k - m_{final})^2}{n-1}} \tag{9}$$

With regard to uncertainty analysis, final uncertainty budgets are listed in Table 2. With regard to interferometer readout, as used in Table 2, "laser stability and accuracy" refers to uncertainty associated with knowing the vacuum wavelength of the laser source. This error is based on the difference between the original wavelength measurement of the laser conducted by NIST in 2012 and a new measurement conducted in 2018. The relative difference was determined to be $5 \times 10^{-9}$. As used in Table 2, "deadpath error" refers to uncertainty associated with calculating the change in the differential optical path length between the reference and measurement arms of the interferometer. This differential change was caused by refractive index fluctuations and has a negligible effect. As used in Table 2, "optics thermal drift" refers to uncertainty associated with knowing the change in geometry of the optical components due to finite coefficients of thermal expansion caused by thermal fluctuations. This effect can be negligible. As used in Table 2, "electronics error" refers to uncertainty associated with frequency variations at a fixed temperature of the optical receiver for plane mirror optics. This effect was $0.1 \times 10^{-6}$ based on performance specifications. As used in Table 2, "Abbe error" refers to uncertainty associated with knowing angular deviation caused by a horizontal separation between the measurement reflector and the trajectory axis of the air bearing. Since the mirror mount was centered on the air bearing within machining tolerances and the laser spot was centered on the mirror surface, this effect is negligible. As used in Table 2, "off axis motions" refers to uncertainty associated with parasitic movements due to unwanted compliance in all DOFs except Z. Horizontal displacement variations in X and Y were measured to be about 0.09 m and 0.17 m over the complete travel range, respectively. Rotation about Y and Z were measured during mass on and mass off weighings to be about 10 rad and 5 rad, respectively. Rotation about Z indicated a 20 rad jumped between force mode and velocity. As reference, a cosine error between force mode and velocity mode of 1700 rad yielded $1.4 \times 10^{-6}$ error. The square air bearing provided nearly zero-friction, single degree of freedom motion, and off-axis errors were deemed negligible. As used in Table 2, "cosine error" refers to uncertainty associated with the deviation of the interferometer beam from vertical. An alcohol pool was a reference surface for this alignment. Angular deviations were amplified by an optical lever of 4.3 m, and the interferometer laser spot was aligned to the alcohol pool spot to within 3 mm and provided a cosine error of $0.1 \times 10^{-6}$.

As used in Table 2, "timing jitter term" refers to uncertainty associated with fluctuations in timekeeping by the TIA and its contribution was determined to be negligible based on the worst case scenario found in the performance specifications thereof. As used in Table 2, "wavelength compensation" term refers to uncertainty associated with calculating the index of refraction correction of air. The correction has a value of approximately $264 \times 10^{-6}$ and was calculated by a modified Edlen equation:

$$n = n_{tp} - [(292.75/(t+273.15)](f/Pa)[3.7345 - 0.0401 \times (\sigma/m^{-1})]^2 \times 10^{-10} \tag{10}$$

wherein $n_{tp}$ is the standard air refractivity; t is the temperature; f is the partial pressure of water vapor expressed in Pa, and a is the vacuum wave number expressed in $m^{-1}$. Here, f is a function of relative humidity and the saturation vapor pressure $p_{sv}$ calculated from air temperature.

The lab was held at standard room temperature, around 24 degrees C., 100 kPa, and 37% RH. Fluctuations on these three values were measured to be about 0.03, 2 Pa, and 0.05% RH during one set of velocity sweeps over a span of a few minutes. This yielded a change in refractive index of approximately $0.02 \times 10^{-6}$. However, uncertainty in determining the absolute index of refraction was dominated by the combined uncertainties associated with the environmental sensor's accuracy in measuring temperature, pressure, and humidity. $0.5 \times 10^{-6}$ relative uncertainty on the refractive index was calculated as a worst case scenario based on the performance specifications. Conducting a Monte Carlo analysis on the modified Edlen equation with the three inputs, each with 10,000 measured data points, reduces the uncertainty to $0.2 \times 10^{-6}$.

With regard to coil Z-position, as used in Table 2, "field gradient" refers to uncertainty associated with a change in magnetic flux density as a function of Z position. The measured BL profile of the MMS magnet system was determined to have a $0.7 \times 10^{-6}$/m slope around Z=0. Since the position feedback controls held the weighing position to within 0.06 m, the BL at Z=0 had an uncertainty of $0.04 \times 10^{-6}$.

As used in Table 2, "material thermal expansion" refers to uncertainty associated with length fluctuations of the suspended components below the measurement reflector. The weighing position was servoed to Z=0 with respect to the reflector so temperature fluctuations combined with the finite thermal expansion coefficient of the coil former lead to a change in distance between the location of the coil and the measurement position. Hence, such a length change can be undetectable with the interferometer. Given the temperature variations in the room, the coil's position can be known to 0.6 m which, combined with the magnetic field gradient, leads to a relative uncertainty of $0.4 \times 10^{-6}$.

As used in Table 2, "statistical" refers to uncertainty associated with the data analysis procedure. The final mass determination was the average value of the whole set of 5 force mode mass determinations and had an uncertainty equal to the standard deviation of the mean. An Allan variance analysis was conducted to verify that the data was Gaussian. Each individual force mode mass determination was the average value of a group of mass calculations bracketed by two velocity mode BL determinations. The uncertainty of each mass determination was the standard deviation of the mean of each group of mass calculations then added in quadrature to the uncertainty of the bracketing velocity mode measurements. These uncertainties were $0.7 \times 10^{-6}$ and $2.8 \times 10^{-6}$ for the 5 g and 1 g determinations, respectively.

Figure 30:
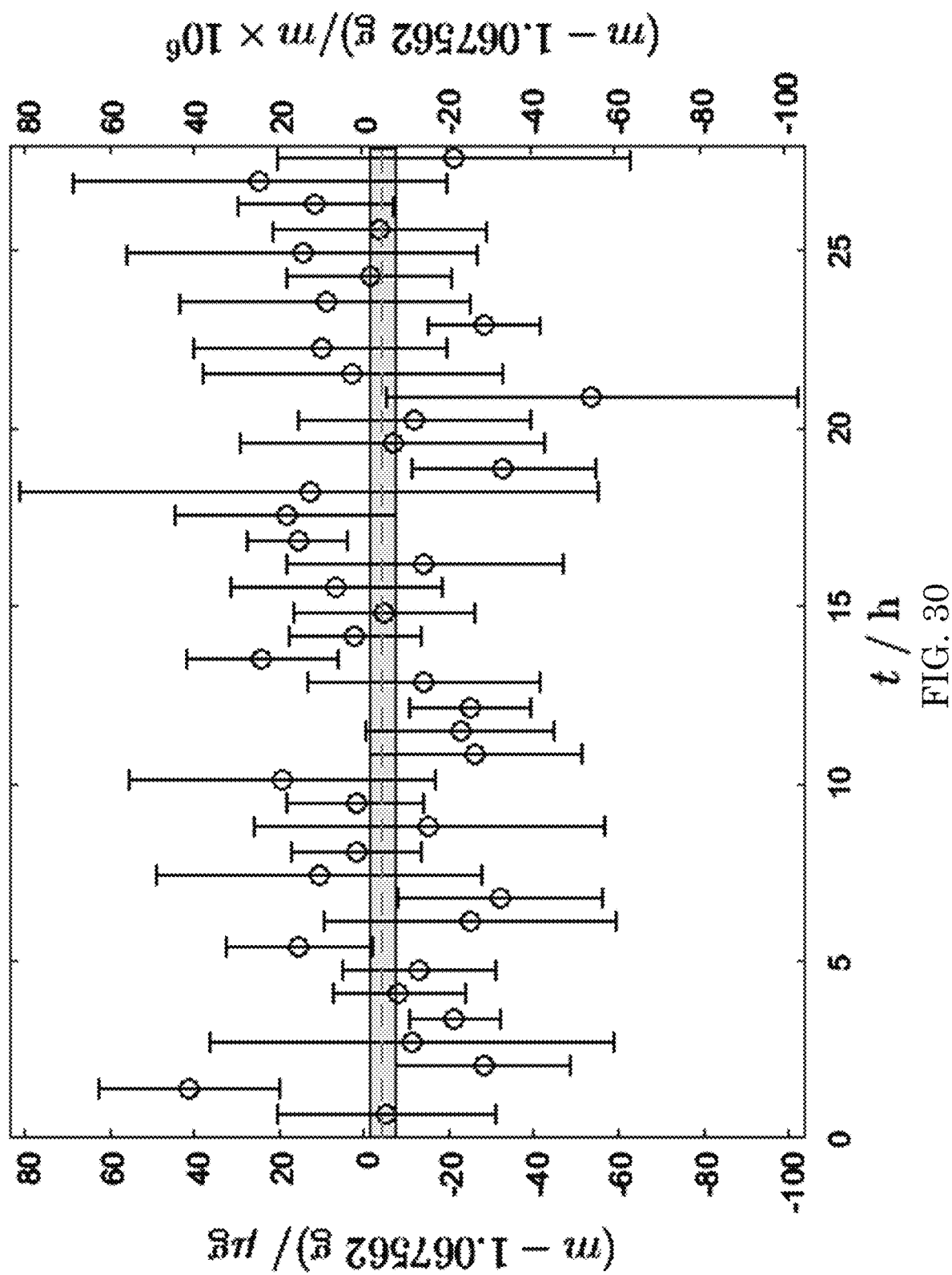
FIG. 30 shows a complete run with 41 mass determinations for a copper cylinder with a mass value of 1.067 562(2) g. Averaging data gives a value of 1.067 557 g (dashed horizontal line) with a relative statistical uncertainty of $2.8 \times 10^{\wedge}(-6)$ (k=1) (shaded band). The measured value was determined to be $4.1 \times 10^{\wedge}(-6)$ less than the true value.

With regard to profile fitting, as used in Table 2, "BL interpolation" refers to uncertainty associated with the calculated BL value for each force mode measurement. Both a linear interpolation per every neighboring pair of BL determinations and a $n^{th}$ order fit interpolation for the entire measurement were implemented and compared. The fit order was chosen depending on the drift shape of the entire measurement. A fifth order fit was selected for the 5 g data set as shown in FIG. 30. The difference in the overall mass determination was $0.2 \times 10^{-6}$ between the two methods.

As used in Table 2, "individual BL profile" refers to uncertainty associated with the variation of the BL profile shape caused by using different fit orders per velocity mode measurement. The individual BL profiles were fitted with both second and third order polynomials. The variation of the BL at Z=0 was $0.7 \times 10^{-6}$.

As used in Table 2, "resistor" refers to uncertainty associated with knowing the absolute resistance value of a 1 kΩ reference resistor that was calibrated against the NIST Graphene Quantum Hall Resistor (QHR) approximately one month prior to the blind measurements. The resistor was calibrated frequently over the past few years and its history indicated a relative drift of approximately $0.5 \times 10^{-6}$/year. Taking into account drift rate and the recent calibration, a conservative uncertainty of $0.1 \times 10^{-6}$ was assigned for the resistor value.

As used in Table 2, "DVM" refers to uncertainty associated with voltage measurements by a multimeter. Following best metrological practices, the DMM used for this measurement was characterized by a programmable josephson voltage system (PJVS). The performance of the 1 V range was measured and had a $0.4 \times 10^{-6}$ gain error and $0.02 \times 10^{-6}$ offset.

With regard to forces on the mass, as used in Table 2, "magnetic susceptibility of mass" refers to uncertainty associated with a magnetic force between the test mass and the ambient magnetic field. This was calculated to have a relative effect of $0.02 \times 10^{-6}$. As used in Table 2, "balance sensitivity" refers to uncertainty associated with a torque caused by the separation between the center of mass of the wheel and its rotational axis. The torque varied as a function of wheel angle, therefore Z position of the coil. By adjusting the mass distribution of the wheel, this separation was adjusted such that the torque was constant near the weighing position. This alignment was not performed here, and the absolute mass balance had a 50 g/m slope near the weighing position. Sensitivity of the absolute mass balance came into effect if the wheel position differed between a mass-on measurement and a mass-off measurement. This measured difference was on average 0.4 nm, due to the imperfect knife edge hysteresis erasing procedure so a relative uncertainty of $4 \times 10^{-9}$ and $2 \times 10^{-8}$ was assigned to the 5 g and 1 g measurements, respectively.

As used in Table 2, "buoyancy" refers to uncertainty associated with calculated air buoyancy correction (i.e., density of air) for a copper mass of density 8.9 g/cm$^3$. The correction was approximately $131 \times 10^{-6}$ with respect to lab environmental parameters. The lab was held at standard room temperature, around 24 degrees C., 100 kPa, and 37% RH. Similar to wavelength compensation, uncertainty in determining the absolute density of air was included in combined uncertainties associated with the environmental sensor's accuracy in measuring temperature, pressure, and humidity. Here, $0.3 \times 10^{-6}$ relative uncertainty on the air density was calculated as a scenario based on the performance specifications. Conducting a Monte Carlo analysis on the air density equation with the three inputs, each with 10,000 measured data points, reduced the uncertainty to $0.1 \times 10^{-6}$.

As used in Table 2, "balance mechanics" refers to uncertainty associated with mechanical hysteresis of the knife edge and was measured by monitoring repeatability of weighing mode current before and after intentional knife edge excursions caused by a 5 g mass exchange. The remaining knife edge hysteresis effects after an erasing procedure was about 1 g. Relative uncertainties were $0.2 \times 10^{-6}$ and $1 \times 10^{-6}$ for the 5 g and 1 g measurements, respectively.

As used in Table 2, "gravity" refers to uncertainty associated with knowing a local acceleration of gravity at a location of the test mass. The value was measured with an FG-5 absolute gravimeter next to the absolute mass balance with an uncertainty of $0.1 \times 10^{-6}$, in agreement with the online Surface Gravity Prediction software value calculated by the National Oceanic and Atmospheric Administration (NOAA) gravity survey. However, since the FG-5 measurement was a single point determination and does not account for earth's tidal changes, the uncertainty of g was $0.3 \times 10^{-6}$.

As used in Table 2, "magnet nonlinearity" refers to uncertainty associated with the level of weighing asymmetry before the start of a measurement. A weighing current-dependent offset force observed in the MMS electromagnet has a $38 \times 10^{-6}$/g effect. For example, if $BL/g(|I_{off}|-|I_{on}|)=1$ g, then the determination would be $38 \times 10^{-6}$ lower than the true value. Prior to the start of a measurement, an iterative balancing procedure reduces the asymmetry to within 10 mg, or a relative uncertainty of $0.4 \times 10^{-6}$.

As used in Table 2, "air bearing pressure" refers to uncertainty associated with input pressure dependent air bearing exhaust forces. A digital pressure gauge was connected to the intake with a resolution of 69 Pa. Pressure data taken over 27 hours was analyzed and determined that the fluctuations coherent with the mass exchanges are limited to have a $1.1 \times 10^{-6}$ uncertainty on the 5 g mass and $5.4 \times 10^{-6}$ on the 1 g mass.

With regard to an uncertainty budget for the absolute mass balance, sources of uncertainty and their relative magnitudes for a nominally 5-g and 1-g mass are listed in Table 2. A source of uncertainty entered with a value of 0.0 indicates that such uncertainty is less than $0.05 \times 10^{-6}$.

TABLE 2

| Source | 5 g measurement | | 1 g measurement | |
| --- | --- | --- | --- | --- |
| | Item | Subtotal | Item | Subtotal |
| Laser Stability/Accuracy | 0.0 | | 0.0 | |
| Deadpath Error | 0.0 | | 0.0 | |

TABLE 2-continued

|  | 5 g measurement | | 1 g measurement | |
| --- | --- | --- | --- | --- |
| Source | Item | Subtotal | Item | Subtotal |
| Optics Thermal Drift | 0.0 | | 0.0 | |
| Electronics Error | 0.1 | | 0.1 | |
| Interferometer Readout | | 0.1 | | 0.1 |
| Abbe Error | 0.0 | | 0.0 | |
| Off Axis Motions | 0.0 | | 0.0 | |
| Cosine Error | 0.1 | | 0.1 | |
| Alignment | | 0.1 | | 0.1 |
| Timing Jitter | 0.0 | | 0.0 | |
| Wavelength Compensation | 0.2 | | 0.2 | |
| Velocity | | 0.2 | | 0.2 |
| Field Gradient | 0.0 | | 0.0 | |
| Material Thermal Expansion | 0.4 | | 0.4 | |
| Coil Z Position | | 0.4 | | 0.4 |
| Statistical | | 0.7 | | 2.8 |
| BL Interpolation | 0.2 | | 0.2 | |
| Individual BL Profile | 0.7 | | 0.7 | |
| Profile Fitting | | 0.7 | | 0.7 |
| Resistor | 0.1 | | 0.1 | |
| DVM (Force Mode) | 0.4 | | 0.4 | |
| DVM (Velocity Mode) | 0.4 | | 0.4 | |
| Electrical | | 0.8 | | 0.8 |
| Magnetic Susc. of Mass | 0.0 | | 0.0 | |
| Balance Sensitivity | 0.0 | | 0.0 | |
| Buoyancy | 0.1 | | 0.1 | |
| Balance Mechanics | 0.2 | | 1.0 | |
| Gravity | 0.3 | | 0.3 | |
| Magnet Nonlinearity | 0.4 | | 0.4 | |
| Air Bearing Pressure | 1.1 | | 5.4 | |
| Forces on mass | | 1.2 | | 5.5 |
| Total | | 1.8 | | 6.3 |

Analyzing the 5 g and 1 g blind measurement data yielded the following values with their associated uncertainties (k=1) shown in Table 3. These data were compared to mass measurements conducted with the conventional subdivision method scaling from a 1 kg artifact and shown in Table 3. Here, $\Delta m$ is a difference in g between two different measurement types, and absolute uncertainties are added in quadrature. Further, $\Delta m/m \times 10^6$ is the same difference but expressed in relative terms, parts in $10^6$. Table 4 shows a comparison of max permissible relative uncertainties of class $E_2$ weights with relative uncertainties for the absolute mass balance.

TABLE 3

|  | 5 g mass | | | 1 g mass | | |
| --- | --- | --- | --- | --- | --- | --- |
| Conventional | 5.018042 g | ± | 0.5 g | 1.067562 g | ± | 0.1 g |
| absolute mass balance | 5.018042 g | ± | 9.0 g | 1.067557 g | ± | 6.7 g |
| $\Delta m$ | 0 g | ± | 9.0 g | 5 g | ± | 6.7 g |
| $\Delta m/m \times 10^6$ | 0 | ± | 1.8 | 5 | ± | 6.3 |

TABLE 4

|  | 5 g mass | 1 g mass |
| --- | --- | --- |
| $\Delta m_{E2}/m_{E2} \times 10^6$ | 2 | 5 |
| $\Delta m/m \times 10^6$ | 1.8 | 6.3 |

Various techniques were available in the voltage measurement without access to a PJVS and that created greater uncertainty. The voltage measurement uncertainties were calculated as $4 \times 10^{-6}$, $14 \times 10^{-6}$, and $4 \times 10^{-6}$ for the absolute mass balance 5 g, 1 g, and velocity mode measurements, respectively, shown in FIG. 33.

The $14 \times 10^{-6}$ voltage uncertainty estimated from manufacturer specifications for the 1 g measurement was due to sampling near the bottom of the 1 V range. Using a 10 kΩ instead of a 1 kΩ resistor to convert the weighing current into a voltage would reduce this estimate of the 1 g force mode voltage uncertainty term to $3 \times 10^{-6}$. Further optimization of the magnet and coil designs can reduce voltage measurement uncertainties to approximately $2 \times 10^{-6}$.

For well-characterized Zener references, frequently calibrate the DVM for a lower uncertainty. For even higher accuracy measurements without a quantum standard, use a fixed resistive divider connected to the Zener and use the absolute mass balance to provide a fixed point mass determination.

The absolute mass balance directly realized gram-level masses in air with uncertainties on the order of a few parts in $10^6$, and the overall measurement uncertainties were competitive with $E_2$ mass standards.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

What is claimed is:

1. An absolute mass balance for determining an absolute mass of an object, the absolute mass balance comprising:
   a dual diameter wheel comprising:
      a balance fulcrum on which the dual diameter wheel pivots; and a balance beam disposed on the balance fulcrum and that pivots about the balance fulcrum, the balance beam comprising:
  a main mass arm in mechanical communication with the balance fulcrum; and
  a counter mass arm laterally disposed proximate to the main mass arm and in mechanical communication with the balance fulcrum;
a main mass receiver in mechanical communication with the main mass arm and that receives the object and that moves with the main mass arm;
a main magnet system comprising:
  a first main coil in mechanical communication with the main mass receiver and the main mass arm, interposed between the main mass receiver and the dual diameter wheel, and that produces a first magnetic field and that moves with the main mass arm;
  a second main coil in mechanical communication with the main mass receiver and the main mass arm, interposed between the main mass receiver and the first main coil, and that produces a second magnetic field, the second main coil being in electrical communication with the first main coil and that moves with the main mass arm; and
  a permanent magnet disposed between the first main coil and the second main coil and that produces a third magnetic field that interacts with the first magnetic field and the second magnetic field;
a displacement measuring system in mechanical communication with the permanent magnet such that displacement measuring system provides a null position of the dual diameter wheel and measures a velocity of the main magnet system; and
a driving motor in mechanical communication with the counter mass arm and comprising:
  an eddy current damper in mechanical communication with the counter mass arm that moves with the counter mass arm, that provides a constant velocity of the main mass receiver, and that suppresses a pendulum mode of the driving motor; and
  a counter mass magnet system in mechanical communication with the eddy current damper,
wherein the absolute mass balance determines the absolute mass of the object by comparing a weight of the object to a calibrated electromagnetic force.

2. The absolute mass balance of claim 1, further comprising a main mass tether in mechanical communication with the main mass arm and the main mass receiver.

3. The absolute mass balance of claim 1, further comprising a counter mass tether in mechanical communication with the counter mass arm and the eddy current damper.

4. The absolute mass balance of claim 1, further comprising a linear motion member in mechanical communication with the main mass arm and the main magnet system and that provides linear motion between the main mass arm and the first main coil and the second main coil.

5. The absolute mass balance of claim 4, wherein the linear motion member comprises:
  a linear bearing in mechanical communication with the main mass arm and the main magnet system; and
  a linear bearing disposed around the linear shaft.

6. The absolute mass balance of claim 1, wherein the balance beam further comprises a center-of-mass adjuster.

7. The absolute mass balance of claim 1, wherein the balance fulcrum further comprises a pivot contactor disposed on a bulkhead, wherein the dual diameter wheel pivots about the pivot contactor relative to the bulkhead.

8. The absolute mass balance of claim 7, wherein the pivot contactor comprises a knife edge, a pin point, or a ball in contact with the bulkhead.

9. The absolute mass balance of claim 8, wherein the pivot contactor further comprises a contact mount and a pin disposed on the contact mount, wherein the pin comprises the pin point.

10. The absolute mass balance of claim 8, wherein the pivot contactor further comprises a contact mount, wherein the ball is disposed on the contact mount.

11. The absolute mass balance of claim 1, wherein the main mass receiver comprises:
  a mass pan on which receives the object; and
  a mass pan gimbal interposed between the mass pan and the main magnet system.

12. The absolute mass balance of claim 1, wherein the counter mass magnet system comprises:
  a counter mass coil in mechanical communication with the eddy current damper; and
  a counter mass magnet in which the counter mass coil is disposed.

13. The absolute mass balance of claim 1, wherein the main magnet system comprises:
  a housing in mechanical communication with a bulkhead;
  a coil former on which the first main coil and the second main coil are disposed and that is disposed in the housing and that moves with the main mass arm and the main mass receiver;
  a first yoke disposed in the housing and in mechanical communication with the housing; and
  a second yoke disposed in the housing and in mechanical communication with the housing and the first yoke, such that the permanent magnet is disposed on and interposed between the first yoke and the second yoke.

14. The absolute mass balance of claim 1, wherein the displacement measuring system comprises:
  a Michelson heterodyne interferometer comprising:
    a laser that produces source light;
    a reference mirror disposed on the housing in optical communication with the laser and that receives the source light from the laser and produces reference light from the source light;
    a displacement mirror disposed on the linear bearing in optical communication with the laser and that receives the source light from the laser and produces displacement light from the source light;
    a reference photodetector in optical communication with the laser and that receives the source light from the laser and produces a reference signal from the source light; and
    a measurement photodetector in optical communication with the reference mirror and the displacement mirror and that:
      receives the reference light from the reference mirror,
      receives the displacement light from the displacement mirror; and
      produces an interference signal from the reference light and the displacement light.

15. A process for determining an absolute mass of an object with the absolute mass balance of claim 1, the process comprising:
  disposing the object in mechanical communication with the main mass arm via the first main coil and the second main coil;
  operating the absolute mass balance in a velocity mode by:

performing a velocity sweep by synchronously moving, at a selected velocity, the object, the main mass arm, the first main coil, and the second main coil relative to the permanent magnet in:
- a first direction that is along a direction perpendicular to a magnetic field of the permanent magnet; and
- a second direction, after moving in the first direction, wherein the second direction opposes the first direction;

determining a first voltage produced from synchronously moving the first main coil, and the second main coil in the magnetic field of the permanent magnet in the first direction and the second direction; and determining a velocity mode product BL from the velocity and the first voltage reading, wherein B is a magnetic field strength and L is a length of wire of the first main coil and the second main coil;

operating the absolute mass balance in a force mode by:
- performing an object-on measurement by:
  - moving the first main coil and the second main coil to a weighing position;
  - removing the object from the absolute mass balance;
  - performing hysteresis erasing of the balance fulcrum;
  - flowing a first force mode current through a measurement resistor in electrical communication with the first main coil and the second main coil; and
  - determining a first force mode voltage produced from flowing the force mode current through the measurement resistor with the object removed from the absolute mass balance;
- performing an object-off measurement by:
  - re-disposing the object on the absolute mass balance in mechanical communication with the main mass arm via the first main coil and the second main coil;
  - performing hysteresis erasing of the balance fulcrum;
  - flowing a second force mode current through the measurement resistor in electrical communication with the first main coil and the second main coil; and
  - determining a second force mode voltage produced from flowing the force mode current through the measurement resistor with the object disposed on the absolute mass balance;

converting the first force mode voltage and the second force mode voltage by weighting the first force mode voltage and the second force mode voltage with the velocity mode product BL to produce an intermediate value; and normalizing the intermediate value with respect to a resistance of the measurement resistor to determine the absolute mass of an object.

* * * * *